(12) United States Patent
Mazzocato

(10) Patent No.: US 12,390,769 B2
(45) Date of Patent: Aug. 19, 2025

(54) FILTERING DEVICE FOR FILTERING A FLUID AND PROCESS FOR FILTERING A FLUID

(71) Applicant: GEM INNOVATIONS SRL, Caselle di Altivole TV (IT)

(72) Inventor: Luigino Mazzocato, Montebelluna Treviso (IT)

(73) Assignee: GEM INNOVATIONS SRL, Caselle di Altivole TV (IT)

( * ) Notice: Subject to any disclaimer, the term of this patent is extended or adjusted under 35 U.S.C. 154(b) by 372 days.

(21) Appl. No.: 17/927,441

(22) PCT Filed: May 26, 2021

(86) PCT No.: PCT/EP2021/064118
§ 371 (c)(1),
(2) Date: Nov. 23, 2022

(87) PCT Pub. No.: WO2021/239847
PCT Pub. Date: Dec. 2, 2021

(65) Prior Publication Data
US 2023/0294045 A1    Sep. 21, 2023

(30) Foreign Application Priority Data

May 26, 2020    (EP) .................................... 20176481

(51) Int. Cl.
*B01D 61/18*    (2006.01)
*B01D 61/58*    (2006.01)
(Continued)

(52) U.S. Cl.
CPC ............. *B01D 61/18* (2013.01); *B01D 61/58* (2013.01); *B01F 27/1151* (2022.01);
(Continued)

(58) Field of Classification Search
CPC .......... B01D 2311/2626; B01F 27/805; B01F 27/93; B01F 27/1125; B01F 27/11251; B01F 27/1151
See application file for complete search history.

(56) References Cited

U.S. PATENT DOCUMENTS

2016/0326473 A1    11/2016    Thurnheer

FOREIGN PATENT DOCUMENTS

| CN | 109418680 A | 3/2019 |
| EP | 2177479 A1 | 4/2010 |

(Continued)

OTHER PUBLICATIONS

International Search Report and Written Opinion issued in connection with corresponding PCT Patent Application No. PCT/EP2021/064118 mailed Aug. 4, 2021.

*Primary Examiner* — Bradley R Spies
(74) *Attorney, Agent, or Firm* — Tarolli, Sundheim, Covell & Tummino LLP

(57) ABSTRACT

The present invention refers to a filtering device for filtering a fluid containing dissolved solutions and optionally colloidal substances, including solvents and solutes, comprising a first filter unit (12) serving to remove substances in a first filtering step by way of a membrane filtration, said removed substances having a molecular weight above a defined limit value, a second filter unit (19), disposed downstream of the first filter unit (12), for the treatment of the permeate of the first filter unit (12), wherein the second filter unit (19) comprises a filter bed comprising at least one filter material of the group comprising graphene, modified graphene, graphite, activated carbon and a zeolite compound, and a third filter unit (20), disposed downstream of the second filter unit (19), for the treatment of the permeate of the second filter unit (19), wherein the third filter unit (20) comprises a porous membrane, through which the liquid to (Continued)

be filtered flows in a cross-flow. The present invention provides a device with the possibility of filtration with high working pressure, avoiding possible clogging inside the adsorbing material and easy regeneration and reactivation of the adsorbing material.

18 Claims, 10 Drawing Sheets

(51) Int. Cl.
  *B01F 27/1151* (2022.01)
  *B01F 27/118* (2022.01)
  *B01F 27/93* (2022.01)

(52) U.S. Cl.
  CPC ............ *B01F 27/118* (2022.01); *B01F 27/93* (2022.01); *B01D 2311/06* (2013.01)

(56) References Cited

FOREIGN PATENT DOCUMENTS

| | | |
|---|---|---|
| FR | 2373319 A1 | 7/1978 |
| FR | 2628337 A1 | 9/1989 |
| WO | 2012040574 A1 | 3/2012 |
| WO | 2015034776 A1 | 3/2015 |
| WO | 2018078427 A1 | 5/2018 |
| WO | 2019243289 A1 | 12/2019 |
| WO | 2020030943 A1 | 2/2020 |

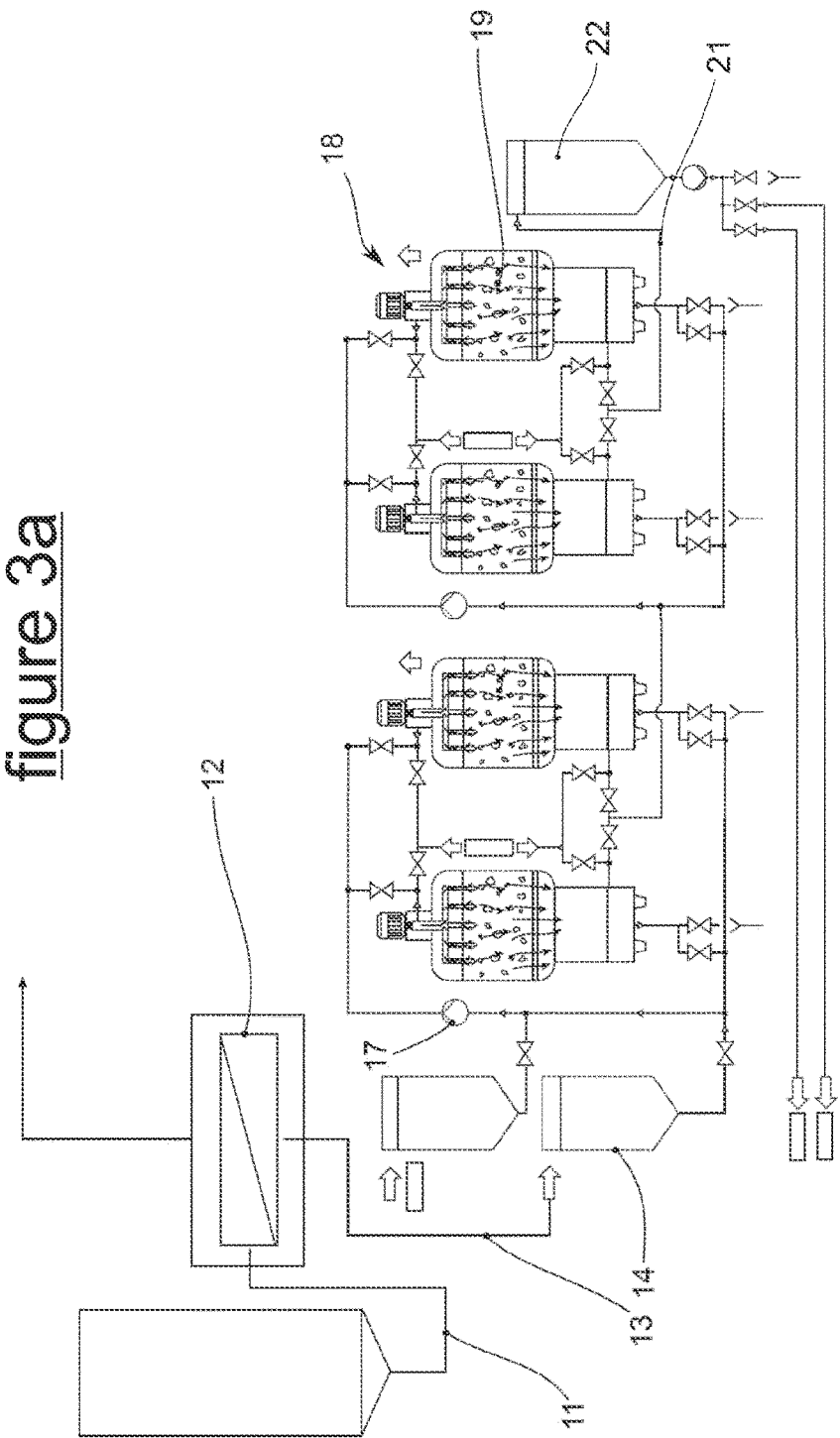

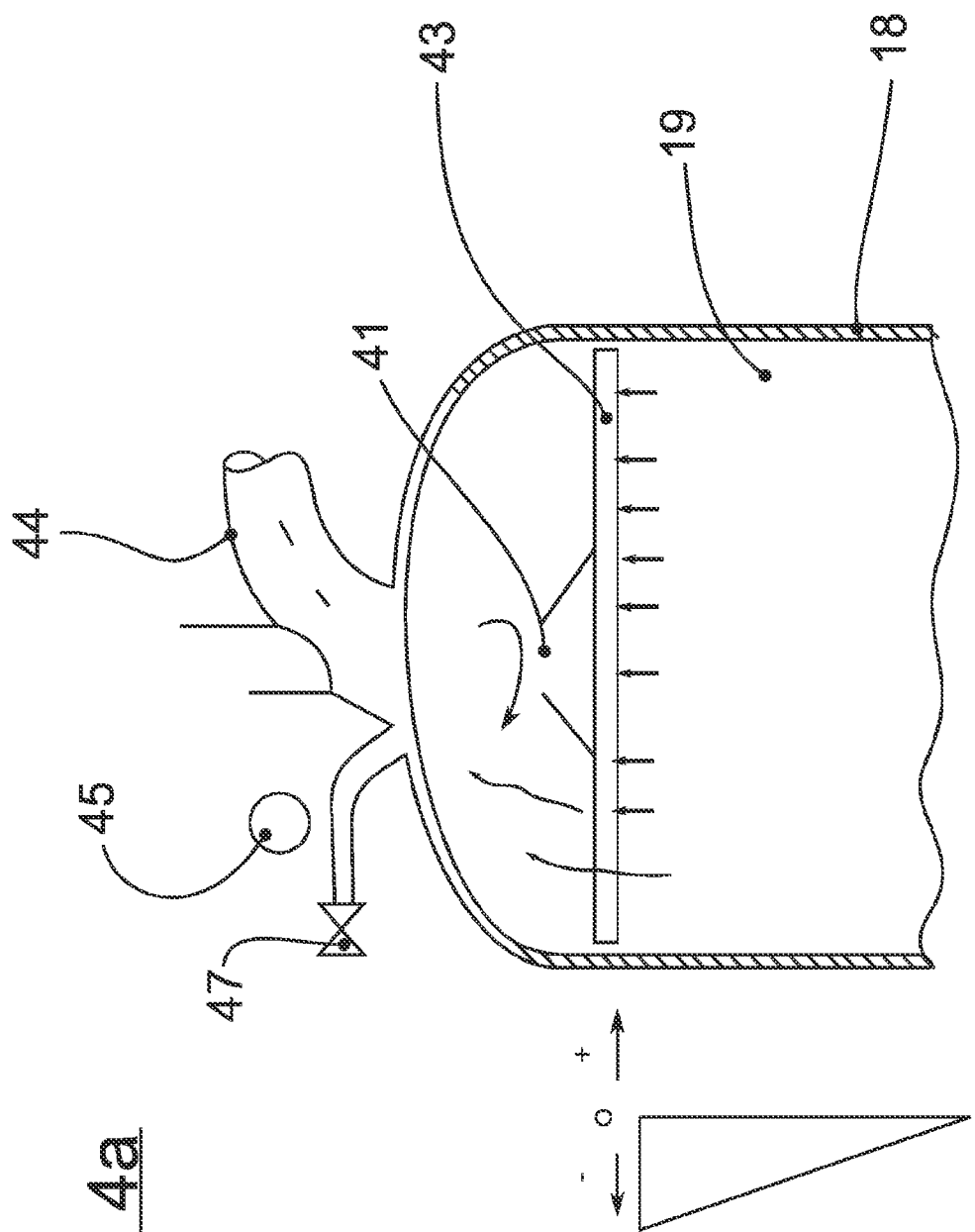

FILTERING DEVICE FOR FILTERING A FLUID AND PROCESS FOR FILTERING A FLUID

RELATED APPLICATIONS

The present invention is a U.S. National Stage under 35 USC 371 patent application, claiming priority to PCT Application No. PCT/EP2021/064118, filed on May 26, 2021, which claims priority from European Patent Application No. 20176481.8 filed on May 26, 2020; the entireties of both are hereby incorporated herein by reference.

The present invention refers to a filtering device for filtering a fluid, comprising (i) at least one first filter unit serving to remove substances in a first filtering step by way of a membrane filtration, said removed substances having a molecular weight above a defined limit value, (ii) a second filter unit, disposed downstream of the first filter unit, for the treatment of the permeate of the first filter unit, wherein the second filter unit comprises a filter bed comprising a particle filter material, preferably comprising at least one filter material of the group comprising graphene, modified graphene, graphite, activated carbon and a zeolite compound, and (iii) a third filter unit, disposed downstream of the second filter unit, for the treatment of the permeate of the second filter unit, wherein the third filter unit comprises a porous membrane.

The purpose of the filtering device of the present invention in a first aspect is to filter a fluid containing dissolved and optionally colloidal substances, and/or further impurities like bacteria and/or virus. A second important aspect of the present invention is to recoup valuable substances, which are retained in at least one of the filter units and which thereafter are recovered from the respective retentate and/or from the filter material of the respective filter unit.

The present invention further refers to a process for filtering a fluid, containing dissolved and optionally colloidal substances, and/or further impurities like bacteria and/or virus, by means of a filtering device wherein said fluid is a liquid, which is filtered in a filtering device with the features mentioned above.

Relevant prior art includes the following patents, literature and filter systems:

U.S. Pat. No. 8,361,321 B2 focuses on water treatment. In this case the filter consists of individual graphene sheets, with porosity such as to allow the deionization of water, as well as the separation of chlorine, and then sodium. In concrete terms, the process known from this document foresees two graphene sheets inserted in series with different sizes/porosity, precisely to allow the extraction of molecules of different sizes. The system provided for by the US patent does not take into account the detection of anti-clogging systems. In summary, also this prior art is not concerned with the solutions that are necessary to solve the problems that are typically found when proceeding with filtration of liquids, which are not water, and therefore contain substances that could clog the system.

WO 2018/078427 A1 describes a graphene-based filtering element comprising a blend of mesoporous graphene compound having pores with average pore size between 0.4 and 250 nm and at least one spacing material in granular form. The graphene-based compound is present as nanoplatelets, sheets or plates of graphene, functionalized graphene or graphene oxide. The filtering material consists of said graphene-based material which is mixed with a spacing material and homogeneously dispersed in a liquid phase. The spacing material can be selected from activated carbon, zeolites, sand, alumina, aluminum silicate and the like. Whereas the graphene-based material consists of porous monolithic elements, particularly shaped as sheets, the spacing material is in granular form with a particle size of about 0.1 mm to 6 mm and its purpose is to avoid the adhesion of the graphene sheets. Said combined filter material is useful for the removal of contaminants from a fluid, for instance waste water, blood or fruit juice.

US 2011/0114573 A1 describes a filtration apparatus with a containment device, like a housing or a cartridge, where the filtration media is located (and within which a fluid passes through). In particular, the filtration media is disposed within the housing either as a homogeneous mixture, or as individual components in discrete predetermined locations. Either way the filtration media is effectively blocked in a given position. In that respect, the figures accompanying the said US patent depict a close cartridge with a closed top, where the filtration material is compressed within predefined locations.

The above-referred prior art does not disclose any particular details about filtering devices which use the specific filter material described hereto before. Said prior art documentation, for instance, is silent about regeneration of the filter material and cleaning of the filter element, hence the system, which occurs regularly during various working phases and cycles of the filtration (so it is a normal working phase of the process) but it may also be relevant after the system has been used for a certain period of time, especially when the system is aimed at liquid (not water) purification or filtration. In certain phases, including when changes of pressure occur, e.g. when the system is started and or stopped, or over some time after normal use, the filter material becomes unstable, clogging occurs, and preferential pathways are created in the filter material. This affects adversely the efficiency of the filtering process. Furthermore the granules of the filter bed rub together, accordingly the filter material disintegrates and releases micro-particles that impurify the filtrate, which as explained below cause also inefficiencies, first of all product loss, and further costs in terms of disposal of the impurities and/or purchase and reintegration of the filter bed material.

The above-referred prior art, and more generally water treatment oriented filtration systems that are in the marketplace, do not disclose any particular details about solutions to avoid dispersion of the substance that composes the filtration bed. In particular, water treatment filtration systems may work for months, without requiring stopping the system. As such, the dispersion of substance that composes the filtration bed, e.g. carbon, only occurs when the system is started, and in the early stage of operations until the systems part of the prior art fully stabilize themselves. In the absence of changes of pressure, cleaning or regeneration, such water oriented filtration systems remain stable, hence no major particles dispersion occurs. This means that the permeate remains relatively pure, and there is no excessive loss of substance that composes the filtration bed. This in turn does not trigger an excessive expense (i) for the final disposal of the impure particles that detached from the filtration bed, or (ii) for the purchase of the material to refill the percentage of filtration bed material that is progressively lost in the unstable phases of the process.

WO 2015/034776 A1 concerns a device for filtering beverages with a first filter unit, which is an ultrafiltration, a second filter unit, which is a molecular sieve, and a third filter unit, which is a reverse osmosis arrangement. The second filter unit contains an ion exchange medium, particularly a base resin or an acid ion exchange material. This document is silent about a mixing device for the material of the second filter unit and resins, which are used as an ion exchange medium, typically are not mixed. Furthermore there is no plate to pressurize the filter medium or any other device to change the pressure within the filter units.

CN 109 418 680 A describes a process for deacidification and debittering of a juice in a tank by means of an adsorption resin, which is filled between an upper filter screen and a lower filter screen, wherein two stirring blades on a stirring shaft are used to evenly disperse the resin in the juice to be treated. Because of the fact that the stirring blades are disposed between the two filter screens it is not possible to move the mixing device in an axial direction.

It is the object of the present invention to provide a filtering device which is adapted to filter fluids in an economical and efficient way, thereby avoiding the above mentioned drawbacks, in particular possible clogging inside the adsorbent material and preferential pathways in the filter bed, thereby ensuring easy regeneration of the filter material and easy cleaning of the filter device, which can be regularly repeated over time to ensure effectiveness of the system.

The solution of the above object is provided by a filtering device characterized by the features mentioned in claim 1 or claim 2 of the present application.

Subject-matter of the present invention thus is, according a first aspect a filtering device for filtering a fluid (a liquid or a gaseous stream) containing dissolved and optionally colloidal substances and/or other impurities like bacteria and/or virus, with at least three filter units with the features mentioned above, wherein the filtering device comprises a rotatable mixing device within a receptacle containing the second filter unit, arranged above the filter bed and/or in the upper zone of the filter bed, within the filter bed, and wherein the rotatable mixing device is moveable within the receptacle in an axial direction relative to the upper zone of the filter bed.

Preferably the filter bed of the second filter unit comprises at least one particle filter material of the group comprising, graphene, modified graphene, graphite, activated carbon, and a zeolite compound.

The primary advantages of the mixing device for the filter bed in the second filter unit are that on one hand it may stir and agitate the filter bed, and on the other hand the axially moveable mixing device is able to pre-compress the filter bed. The invention provides a mixer or stirrer which breaks up the filtering bed and recompacts it naturally or forcibly thanks to pre-compression depending on the product or compound. The specific mixing device may consist of a perforated plate with knives or blades, and depending on the position of the plate it makes it possible to create a more or less important pressure on the material of the filter bed.

According to the present invention the filtering device comprises a rotatable mixing device within a receptacle containing the second filter unit, above the filter bed or in the upper zone of the filter bed. The mixing device may for instance be shaped similar to a whisk or the like. The rotation of the mixing device generally will not be continuous, but it is sufficient to carry out the rotation in certain phases. The mixing device can have other purposes than the mixing of the particles of the filter bed. When the device is in the filtration mode the upper part of the filter bed can be levelled in order to make the upper surface of the filter bed homogeneous and distribute the pressures evenly. A second purpose is to hold the filtering bed in the vacuum phase, wherein a low pressure is created in the space above the filter bed. Usually the mixing device is adapted only to mix the granules in the upper region of the filter bed thereby eliminating preferential pathways in the filter bed material which would compromise an efficient filter action.

According to a preferred embodiment of the present invention the pressure drop and load difference in the second filter unit can vary, depending on the variation of the compounds used for the filter bed and/or specific requirements. By means of a pressure diagram it can be shown, how much pressure a liquid needs to pass through the filtering layer, whereby the invention uses a kind of physical filtration in the second filter unit, which is different to ion exchange systems used in the prior art. As a liquid passes through the filtering layer of the second filter unit, the pressure required to pass through it decreases until it is almost zero downstream of the filter bed. This pressure can be provided by the fluid or with the help of a plate, which is part of the mixing device and which is axially moveable, which, as it descends, creates additional pressure (a preload) on the fluid. Alternatively the pressure inside the filtering bed of the second filter unit can for instance also be managed with the pressure drop of the membrane of the third filter unit or with the closing of valves at the filter outlet.

In some compounds used for the filter bed of the second filter unit a plate on the mixing device, which compacts the filter bed is not necessary because the pressure drop is very high, on others, such as carbon with a high graphene content, being lighter, it is advantageous to increase the pressure drop. The pressure load can be managed dynamically with the respective speed of movement of the mixing device pressing the filter bed, depending to the flow or during the duration of the filtration process.

By means of a plate of the mixing device or a combination of several devices (pump, valves etc.) the filter bed can be preloaded during filtration, while during regeneration the preload can be removed and the filter bed can be mixed or broken to improve and ensure the cleaning or regeneration of the filter material.

The vertical pressure or preloading can be adjustable depending on the material used in the filter bed, whether it works under pressure, or a vacuum may be used to keep the filter bed down. Regeneration of the filter bed can be carried out using chemical detergents or natural and non-chemical solvents, such as for example ethyl alcohol, glycerol or high oleic oil.

In a process of filtration of aqueous liquids it is possible to remove preferential pathways in the filter bed of the second filter unit by adjusting the preload pressure, by increasing or decreasing the pressure drop, which makes it possible to ensure an efficient filtration, as for example the filtration of per- and polyfluoroalkyl substances (PFAS). The filtering device can be operated in equal current even during regeneration and preferably always in the same flow direction, with the flow from top to bottom of the receptacle, thereby removing all probability of air bubbles, which could generate preferential pathways.

If the filter bed is excessively pressed and needs to be washed or regenerated by removing the pre-charge and mixing or breaking the blockage generated by the pressure, the system can be restored and the pressure drop can be brought back to lower or factory values.

According to one possible embodiment of the present invention, the filtration media of the filter bed of the second filter unit is open in its top region, in particular the filtration media is not compressed from above, which means preferably there is a void above the filter bed between the filter bed itself and any further structure which forms part of the receptacle, which receives the filter bed, i.e., which forms a housing for the filter bed. Such an 'open on top' concept differentiates the present invention from traditional filter beds, that are compressed within a cartridge. The invention creates the possibility to decide the level of pressure to be applied to the filter bed.

According to a preferred embodiment of the present invention the rotatable mixing device comprises a perforated plate with holes and/or slots and preferably a system of stirring elements like for instance wedge-shaped wires, blades, knifes or the like on the lower side of said plate serve as the mixing device. These stirring elements break up the filter bed of the filter unit and the device recompacts it naturally or forcibly thanks to pre-compression by the perforated plate, which, depending on its position can create a more or less important pressure on the filter bed.

If the receptacle is essentially cylindrical, a circular plate preferably is used. In case of receptacles with different section, the contour of the plate is adapted in accordance with the section of the receptacle.

The plate and the mixing device con rotate and move axially (upwards and downwards) for instance by means of a hydraulic or pneumatic device, such as a piston, or a mechanical device, such as a gear unit, or a spindle, or even two or more drive units of this kind. The purpose of the axially moveable plate is to pre-compress the material. Some materials require only agitation by the mixing device, some only pre-compression and some require both.

The rotation of the mixing device may be non-continuous and it may rotate for instance only when the preload pressure on the filter bed is removed. Alternatively, instead of the agitation, there can be pressure back on. Predominantly a slow rotation speed of the mixing device is recommended in order to avoid breaking of the filter material. If during a certain phase only mixing is intended, the mixing can take place continuously. If, however, the mixing device shall deliver pre-compression, the mixing device preferably works, when the pre-compression is removed and the filter bed is free to move.

According to the present invention, in at least one first filter unit molecules of more relevant dimensions are removed, such as colour or polyphenols or colloids, since these molecules, if not preliminarily removed, could clog or limit the adsorbing capacity of the filter material of the second filer unit and would progressively reduce the effectiveness of the entire filtration process. There may be more than one first filter units and the first filter stage may include a preliminary roughing stage, with for instance the effect of removing superfluous parts from a material in its rough state to prepare it for further processing.

In the first phase of separation which uses at least one first filter unit the solution is treated with a membrane. This first filter unit may comprise a microfiltration and/or an ultrafiltration and/or a nanofiltration and/or a reverse osmosis membrane which serves to have an initial separation between the solution and the components that are to be retained based on their molecular weight. The solution is separated into two parts, the retentate or concentrate which contains most of the pigment components and colloidal substances, whereas the permeate of the first filter unit contains mainly low molecular weight molecules such as for instance salts, acid sugars and a small part of pigments. These components can be removed in the second filter unit. Depending on the purpose of the filtration or purification, and hence depending on the applied process, either the permeate or the retentate (resulting from the first roughin stage within the first filter unit) may be injected into the second filter unit. The retentate may also contain valuable substances and the present invention includes the possibility to recover such valuable substances, which are retained by the filter, particularly as by products as for instance malic acid or polyphenols.

Microfiltration membranes usually are adapted to separate molecules with a size of between about 5 μm to 0.1 μm. Ultrafiltration membranes usually are adapted for the separation of molecules with a molecular weight between 300,000 and 10,000 Daltons and/or a size between about 0.1 μm to 0.03 μm. Nanofiltration membranes usually allow the separation of molecules with a molecular weight in a range between 10,000 and 200 Daltons, depending on their respective pore size. Lamellar membranous atomic layer material adopted for this invention based on carbon, graphene, graphite or other nanocomposite material allow the separation of molecules between about 400 and 150 Daltons. For the present invention, as explained in other sections, other materials may be applied for the membranes, hence enabling separation of substances of an even inferior dimension down to 0.3 nm, i.e. 3 Armstrong.

The second filter unit is particularly suitable to adsorb or absorb and retain certain types of particles with molecular weights over, for example, 350 Daltons, but it may adsorb or absorb and retain much smaller molecules, depending on the material(s) that individually or in combination constitute the filtration media for the filtration bed. The second filter unit can be designed to work with aggressive or non-aggressive materials, for instance food related materials, even with high alcohol content, both at low and very hot temperatures, with pressures that can reach preferably up to 40 bar. The particles retained by the filter bed of the second filter unit can be recovered by an acidic or alcoholic alkaline solvent and recovered in a third phase by separation or distillation.

According to one possible embodiment of the present invention in the filter bed of the second filter unit for example a specific filter material could be used comprising:
a blend of mesoporous graphene compound having pores with average pore size between 0.4 and 250 nm and
at least one spacing material in granular form having an average particle size between 0.1 and 6 mm
wherein the contribution of pores having an average pore size from 2 and 50 nm to the total specific surface area of the mesoporous graphene compound is not less than 50% of the total specific surface area and
wherein the minimum density of the filtering element is at least the 15% of the bulk density of the spacing material.

The third filter unit in turn primarily has the purpose to remove micro and/or nano-particles which may be generated by disintegration of the filter bed material of the second filter unit. By combining at least three filter units allows refining a desired product to a high degree of purity, with minimal losses of the of the product to be purified or extracted, while maintaining the efficiency of the filtering system and its economy as well the organoleptic characteristics of the desired product. The filtering system is designed to contain reusable filter bed material without the need to dispose said material and thereby saves costs, time and space, while, as said reducing product losses. The specific adsorbent or absorbent material of the filter bed of the second filter unit according to the present invention has a similar function like a membrane and is suitable for different types of low or high density nanocomponents with greater absorbent power, for example activated carbon, graphene, zeolites. The adsorbent or absorbent material of the second filter unit can comprise particles of different size without the danger of releasing any particles into the final product, because the third filter unit is disposed downstream of the second filter unit.

The present invention focuses on gas or liquid filtration, where the gas or liquid contains larger molecular weight substances (compared to the substances contained in the water). As such, the substances may clog the membrane, which in turn requires regular cleaning and regeneration, which in concrete means stopping and restarting the system, hence changing pressure, at regular intervals. These regular pressure and condition changes in turn do create pathways, which unless tackled with appropriate devices and solutions, ultimately affect the entire performance and integration of the filtration system.

Apart from being particularly suitable for the filtration of liquids the filtration system according to the present invention can also be used for filtering air or gases, for instance an airflow which is contaminated with bacteria and/or virus. In this case the filtration device could for example operate similar to a scrubbing device which has a gas inlet, a gas outlet, an inlet for a liquid scrubbing solution and an outlet for charged scrubbing solution. In this case the scrubbing solution absorbs bacteria or virus contained in the contaminated gas stream and thereafter said scrubbing solution can be purified by means of the filtration system of the present invention. Alternatively a contaminated gas stream can also be mixed with a scrubbing liquid by spraying the latter into the gas stream and thus generating a combined gaseous/liquid stream first, which thereafter is passed into a reactor comprising the filtration system of the present invention. In such a filtration process on one hand a purified gas stream results as well as a liquid stream which comprises solids and other impurities including bacteria and virus as mentioned above.

The use of the above-referred prior art filtration systems often results in major particle losses, which would render impure the permeate, and would also trigger major production costs and inefficiencies related to (i) the disposal, in the example, of carbon, and (ii) the purchase of the carbon that is lost and has to be injected so as to recreate the filtration bed. The present invention therefore, compared to prior art, provides a number of solutions that are disclosed so as to create a pure permeate without particles of filtration bed, while tackling the problem of the creation of pathways, and dispersion of material composing the filtration bed, in spite of the regular need to stop and restart the system after cleaning and regeneration. The present invention provides a solution that effectively enables to recycle the particles that are initially detached from the filtration bed, as they are progressively recouped and reinserted into the filtration bed, thereby ensuring its integrity over time. Amongst others, these solutions include the mixer, the vertical pressure, the preliminary roughing stage, the series of filtration units, the CIP and the tailored recycling regeneration system.

The above-referred prior art is generally focused on water treatment, hence it does not disclose any particular details about process and device aspects of the present invention that are specifically designed to deal with liquids, incorporating substances of different molecular weight. More generally, the invention described in the present patent can be applied in the context of water treatment, but it is primarily focused on extraction and recovery of colour, odour, acids, and many more substances that are present in the liquid that are treated with this process and device. Therefore, as for any filtration process, the product that is of interest may be either the purified liquid (permeate) or the noble substances that are adsorbed by the filter and then recouped for further use. For this reason, this invention refers, for instance, to an interrelated process and device that comprises a preliminary roughing stage, a series of filters, a mixer, a plate, and many more components, which working in combination with one another tackle the problem of creation of pathways that in turn would affect the system integrity, as further explained below.

On the other hand, the present invention provides a highly effective filtration system for gases or liquids. Depending on the substance to be purified and/or the substance to be extracted and recouped, the system may involve specific and tailored additional processes, such as, for instance, the reverse osmosis, that are aimed at avoiding product losses. Such additional processes may be applied from the early stage of the overall process, up to the very end. Given the possibly frequent change in pressure, injection of cleaning water or caustic soda, regeneration, as well as system stop and restart, product losses occur through the overall process (in those phases where the system is not fully stabilized). Hence, the said, multiple tailored additional processes are essential to be able to maximize the efficiency of the overall filtration system, while minimizing product losses as well as costs associated with disposal of impurities and/or reintegration of the filtration bed.

Also the present invention foresees the use of filters in series, however the filters are not all constituted by graphene, on the contrary in any case filters are foreseen that are not constituted by graphene. According to a preferred embodiment of the present invention graphene, among other materials that can constitute the filter bed, may be combined or blended with other materials, for example vegetable activated carbon (in granules) precisely to maximize the adsorption capacity of the compound. In fact, the present invention provides the possibility of combining and functionalizing different materials according to the purposes and applications to be pursued through the various filtering systems to be developed.

In the case of the present invention, the filtering system foresees a variable number of filters in series, with different purposes and characteristics, according to its own functionality to be pursued (for example retaining molecules of different dimensions), where graphene could be used but only for one of the various filtering systems, and where the graphene does not constitute a fixed and immobile layer, but on the contrary where the graphene remains free to position itself, compact itself and modify its morphology, since layers of sheets are not used, but instead the invention preferably uses flakes that can, or rather must move to fill any preferential channels that are formed.

The washing/regeneration system that characterizes the present invention is superior to former systems because it is combined with various membranes and intervention upstream and downstream of the filtering stage that contains graphene.

Preferably further devices are provided in the process of the present invention, such as a mixer for the filter bed, to mention one of the various elements described in more detail below.

Furthermore, with respect to the filter made of graphene, even if this material is chosen for the second stage filter, there are upstream and downstream filtering systems, which provide for a degreasing process as well as a trap-filter that works in a different form from the typical adsorbent filter made of graphene (regardless of the fact that the graphene is functionalized and works in combination with another absorbent substance such as active carbon, zeolite or other compound or polymer, whether it is absorbent, agglomerating or has another function). In addition, the present invention involves the use of graphene with flakes whose position changes regularly, depending on the frequent starting and stopping of the system, the different pressures, depressions or vacuums applied, the temperature of the bell casing, whether or not water and/or caustic soda, among other process liquids, is used.

Additionally, the already documented self-regeneration or auto-repair capacity of graphene also increases efficiency in connection with the processes to close holes and/or pathways in the filtration bed. The adoption of graphene together with the application of state of the art technology as well as technology identified in the present invention is helpful to guarantee the integrity of the filtration be over time, which in turn reflects also the overall efficiency of the filtration system.

A recycling and recovery technique can optionally also be applied in the case of this invention. In particular, in the case where micro and/or nano-particles detach from the filter bed during the filtration process (which in turn depends on a number of factors, such as the product to be filtered, or the material making up the filter bed), the process itself provides for a recovery of the micro and/or nano-particles, first of all to ensure the purity of the permeate. In addition, once separated and recovered the micro particles are pushed back from the top of the bell, allowing the micro particles to position themselves and compact again inside the filter bed. The recovery and recycling of the adsorbing filter material (e.g. graphene and/or carbon) in the case of the present invention takes place within the process itself, during the work of the various filter units, so it is not a matter of recovery of aggregating material (such as a PSU) waste from other production chains.

The present invention allows to filter liquids repeatedly on an industrial level, thanks to a process that contains phases of degreasing, but also phases of cleaning and regeneration of the filtering system, and in the case also recovery of noble substances extracted from the liquid being filtered.

Within the filtration process according to the present invention, absorption and/or adsorption rates will be preferably calculated according to the absorbent materials used or the product to be treated according to the laws of adsorption isotherms, including but not limited to the following: Henry isotherm, Freundlich isotherm, Langmuir isotherm, Langmuir sigmoidal isotherm, Volmer isotherm, Frumkin isotherm, van der Waals isotherm, and BET isotherm.

The filtration system and process of the present invention thus involves various filtration stages, depending on the purpose of the filtration and on the dimension and molecular weight of the materials to be separated. The first stadium, a roughing stage in the first filter unit, involves a filter that is preferably composed by a material which is characterized by a larger granularity compared to the materials that compose the filters used in the second filter unit and/or in the third filter unit. The various filtration and separation processes and the various materials selected individually or in combination with each other to constitute the filtration media in the various stages of the present invention altogether enable to capture a wide range of materials, spanning from (i) macroparticles, such as for instance granular activated carbon or microparticles, such as for instance bacteria or fine dust (which are typically captured by particle filtration), (ii) pigments (which are typically captured by micro filtration), (iii) viruses, such as for instance the Covid-19 virus, with a dimension equal to approximately 100-150 nanometers (which are typically captured by micro or ultrafiltration), or (iv) sugars, salts, herbicides, pesticides or metals (which are typically captured via nanofiltration or inverted osmosis).

According to a preferred embodiment of the present invention the second filter unit is disposed within a receptacle and the filtering device comprises at least one automatic cleaning system (clean in place system CIP) comprising an inlet for a cleaning solution arranged at the receptacle upstream of the filter bed of the second filter unit. Regeneration of the filter bed material can be performed for instance with a hydroalcoholic solution as washing medium. When the filter bed material is exhausted, the automatic cleaning system starts a washing phase wherein the washing solution is pumped into the receptacle by an inlet, thereby cleaning and neutralizing the filter bed material and bringing the system back into a clean and pH neutral environment. Additionally or alternatively the CIP system can intervene with a steam sterilization passing steam through the inlet of the CIP system.

Washing of the second filter unit in the regeneration phases can be performed, for instance, with detergents and/or with caustic soda to eliminate the molecules that have deposited and are adsorbed by the filter bed, thereby recovering said filter bed for subsequent use. This washing typically takes place on a regular basis, i.e. when the output product does not meet the required purification conditions. For example the washing frequency can be every few hours. The cleaning and regeneration process takes place within the plant, without the need to remove and/or replace the filter. In the cases where, over time, the material used for the filter bed would not regenerate in the correct manner, or would no longer operate its adsorbent function efficiently, then then a further second phase of regeneration or reactivation could take place. This kind of regeneration takes place outside of the plant and requires prior extraction of the filter for it to be regenerated and/or reactivated for instance by a pyrolysis process. In particular, the pyrolysis process takes place inside a furnace that brings the filtering bed to a high temperature (in the absence of air), where the substances deposited on the filtering bed pass to the gaseous stage and are then eliminated. The regenerated and/or reactivated filter is then reinserted into the filtering system. This process can be repeated several times.

In contrast to the filtering device disclosed in the above mentioned US 2011/0114573 A1, the filtration media in the present invention is free to move, change position, and recompact itself. The filtering bed in the present invention is regularly reshaped by the turbulence created by a mixer, but also when pressure changes, including when there is depression (as per vacuum effect), where the temperature changes, or where the filtration bed gets wet or dries up. The filtration bed in the present invention is not blocked into any straight jacket, or predefined position; instead, it is free especially in the upper part, as there is no closed top or 'plug'. The fixed position of the filtration media in the US patent is understood to have limitations in terms pH, temperature and pressure, and ultimately is understood to present the already described problem of the creation of pathways.

According to a preferred embodiment of the present invention the filtering device comprises an ultrasonic cleaning device, assigned to the third filter unit. The third filter unit of the present invention can comprise for instance a metal membrane of stainless steel. By the ultrasonic cleaning device unwanted substances and micro and/or nano-particles deposited and retained by the porous membrane can be extracted by means of ultrasonic vibrations. Membranes of other materials can also be used, for instance organic of any type (for instance capillary or spiral) or inorganic membranes made of metal or membranes of mineral origin (for instance ceramic). These membranes are used as trap filters and retain any particles of adsorbent (or absorbent) materials if they have detached particularly from the filter bed of the second filter unit during the filtration phase. Once the filtration phase is over, it is possible to wash the system like any cross-flow filter, i.e. using the pump. Thus it is possible to use the membrane repeatedly, it might even be possible that there is never a need to replace the membrane of the third filter unit.

By means of the above mentioned ultrasonic system and/or vibration system it is also possible in a final stage to keep the carbon or graphene-based micro and/or nano-particles in suspension between a perforated plate and the porous membrane of the third filter unit, in order to recover the material of the filter bed and return it to the top of the filter bed. The ultrasonic system and/or vibration system can also be used, during the filling and axising phase, to make the product, once inserted, more compact thanks to a better distribution.

Ultrasounds created by the ultrasonic cleaning device are used in combination with other cleaning devices or alone and, like the mixing device, they are intended to create a series of sonic waves to help clean particularly the lower part of the second filter unit.

If for instance stainless steel membranes are used in the third filter unit, ultrasounds also facilitate the filtration process in this filter unit. During filtration, gel layers are created between the planes and could create preferential pathways. The use of ultrasounds, either in combination with the blender or individually, can improve filtration by breaking down these gel layers. If the filter material is very finely chopped to for instance less than 1 mm, it is not essential to use ultrasounds but only a blender can be used. But if the material is not finely chopped and therefore in granules (for instance greater than 3 mm), it is advantageous to use ultrasounds to avoid the crushing or blade effect of the filter material.

According to the present invention, the rotating mixing device is not intended to break up the compound of the filter bed in the second filter unit, but to break up the filter bed when compacted, as well as to widen the flow, change the pressure, and limit the displacement of the compacted filter bed. Thus, since there is no comminution process of the filter material, in fact it remains unchanged.

The graphene and carbon, which are preferably used as the filter material in the filter bed of the second filter unit, are not subject to particular abrasion, because instead of remaining stationary and breaking up as the blades or saucer of the mixing device pass, they simply move from their original position, so the previously compacted filter bed, as if it were a single block, breaks up but the graphene flakes and carbon particles do not crumble any further.

Then, in the event that there are leaks, according to the invention preferably a recycling system is provided, where the leaks are collected by the third filter unit, and then through a recycling process the leaks from the bed are reinserted into the receptacle, and then they fall back and are compacted in the filtering bed that constitutes the second filter unit.

Moreover, preferably the mixing device and/or its blades cover only a superficial part of the compacted filtering bed. Therefore, this also contributes to reducing possible abrasion. The mixer will preferably operate in the wet phase and not in the dry phase, so there will certainly not be any problem of abrasion or further crushing of the filter material in the filter bed of the second filter unit.

The speed of the rotation preferably is very slow to avoid breaking the filter material.

If there is any problem of abrasion, this is at least lessened by the graphene material as this promotes abrasion resistance because the graphene is identified as a promising adjunct to improve lubricant performances, particularly if graphene is used in the form of nanoplatelets, which is preferred within the scope of the present invention.

According to a preferred embodiment of the filtering device a receptacle containing the second filter unit is provided with a cooling or heating system in order to maintain the filter bed at a predetermined temperature or within a predetermined temperature range. The receptacle wherein the second filter unit is disposed can be insulated. In order to enable cooling or heating of the second filter unit the receptacle is encased with a kind of cooling or heating jacket with an input line for a cooling or heating medium and a respective output line for said medium, such that the liquid to be purified and the filter bed can be maintained on a predetermined temperature.

According to a preferred embodiment of the present invention the filtering device comprises a vacuum system including a vacuum pump and a vacuum conduct connected to the upper part of a receptacle containing the second filter unit, adapted to create a vacuum within the receptacle in a sector above the filter bed. By such a vacuum system volatile substances like gases or vapours of solvents can be extracted by suction and discharged from the receptacle housing the second filter unit via a vacuum conduct. By means of a depression in the filter bed it is possible to extract aromatic or alcoholic parts from a liquid by means of vacuum distillation. Volatile substances will be condensed and recovered e.g. by means of a condensate recovery system.

According to a preferred embodiment of the present invention the filtering device comprises a first receptacle which comprises at least one second filter unit with a filter bed and at least one third filter unit with a porous membrane, further comprising a second receptacle which comprises at least one second filter unit with a filter bed and at least one third filter unit with a porous membrane, wherein said first receptacle and said second receptacle are arranged in parallel or in series. This embodiment of the invention enables to perform the filtration process continuously. There are two receptacles, each of them equipped with pumps, valves, lines, mixing devices, flow meters, measuring instruments for temperature, pressure etc. each receptacle housing a second filter unit and a third filter unit, respectively. Such a system makes it possible to operate the filtering system of the first receptacle in a filtering mode, whereas in the meantime the filtering system of the second receptacle is in a cleaning mode. After a certain period of time, when the filter bed in the first receptacle needs a regeneration or cleaning, the filter bed in the second receptacle switches into the filtering mode, whereas the filter bed in the first receptacle switches into the cleaning mode. Thus the filtration process in the whole system can be carried out continuously.

The configuration described above can alternatively be operated in a batch mode (discontinuously), if both receptacles are arranged in series. In this case the liquid to be purified can first be passed through the second filter unit and the third filter unit of the first receptacle and thereafter be passed through the second filter unit and the third filter unit of the second receptacle, in order to achieve a still more efficient purification. With such a configuration it would be possible to use a filtering material with a different composition in the filter bed of the second receptacle in order to eliminate other substances in said filter bed than in the filter bed of the first receptacle. For example, the first receptacle could contain a filtering bed composed of graphene and a specific type of activated carbon that are particularly suitable to discolour wines or juices, while a subsequent receptacle could contain a filtering bed composed of zeolite and graphene-based material that are particularly suitable to remove alcohol. Furthermore the receptacles could be substitutable, that is it could be possible to integrate in the system first a filtering system in order to recover aromas, sugars of other noble substances, whereas in a following phase the above mentioned receptacle (bell) could be substituted by another one in order to eliminate odors or to treat substances having a particularly reduced molecular dimension, or for whatever other envisaged purpose.

According to a preferred embodiment of the present invention the filtering device further comprises a cleaning system adapted to clean the filter bed of the second filter unit in the first receptacle in a cleaning modus while the filter bed of the second filter unit in the second receptacle is operating in a filter modus and vice versa to clean the filter bed of the second filter unit in the second receptacle in a cleaning modus while the filter bed of the second filter unit in the first receptacle is operating in a filter modus.

According to a preferred embodiment of the present invention the filter bed of the second filter unit comprises nanoplatelets, sheets or flakes of graphene, graphene oxide or graphite in combination with a spacing material in granular form selected from activated carbon and a zeolite compound. Specific filter materials of this kind and there detailed specification are described in WO0 2018/078427 A1, the whole content of which is incorporated herein by reference.

Subject-matter of the present invention further is a process for filtering a fluid, containing dissolved and optionally colloidal substances, and/or further impurities like bacteria and/or virus, by means of a filtering device wherein said fluid is a liquid which is filtered in a filtering device according to one of claims 1 to 11 and wherein the process comprises different phases, namely at least one filtering phase, wherein the liquid is passed through the second filter unit and consequently passed through the third filter unit and at least one regeneration phase, wherein particles detached from the filter bed of the second filter unit are recovered and recirculated to the second filter bed and/or at least one regeneration phase, wherein the membrane system of the third filter unit is regenerated by means of a cleaning liquid circulated through the third filter unit.

According to a preferred embodiment of the process according to the present invention the filtering device comprises a first receptacle which comprises at least one second filter unit with a filter bed and at least one third filter unit with a porous membrane, and the filtering device further comprises a second receptacle which comprises at least one second filter unit with a filter bed and at least one third filter unit with a porous membrane, wherein said first receptacle and said second receptacle are arranged in parallel or in series and wherein the filter bed of the second filter unit in the first receptacle is cleaned in a cleaning modus while the filter bed of the second filter unit in the second receptacle is operating in a filter modus and vice versa the filter bed of the second filter unit in the second receptacle is cleaned in a cleaning modus while the filter bed of the second filter unit in the first receptacle is operating in a filter modus.

According to a preferred embodiment of the process the liquid to be filtered and purified is one of the group comprising beverages, pharmaceutical products, chemical products, cosmetic products. Possible applications of the process of the present invention for instance in the food or pharmaceutical beverage industry concern the elimination of specific molecules in the permeate of selected products and make a rectified and clean product ready for further treatment. Examples include the gentle separation of all kind of sugars from the colloidal part and the pigments and the macromolecules, creating clear products containing mainly water, sugars, alcohols, acids and salts. All sugars from sucrose to glucose, fructose, mannitol, xylitol, including lactose, can be treated. Flavorings such as terpenes can be recovered by vacuum process and/or organic solvents. Organic acids such as malic acid can be recovered, for instance by solvent. Sugars can be filtered, caffeine can be removed, odors can be removed, colours in products such as sugars, wine, vinegars etc. can be removed, hemicellulosic hydrolysates (second generation sugars) can be purified.

Further examples in the pharmaceutical field include the cleaning of permeates, obtaining selective fractions such as paracetamol Xantumol, or certain types of terpenes such as Humulene. Further recovery of polyphenolic substances (by solvent), purification of drugs as antipyretics, selection or purification of natural drug-like substances, removal of colour and purification of chemical-pharmaceutical products, e.g. treatment of antibiotics or removal of colour and purification of shellac glycerine or encapsulation of ions and molecules, with delayed release properties, treatment of skin problems, and synthesis of antibiotics.

In the cosmetics sector resveratrol can be recovered or purified, plant or algae extracts can be recovered or glycolic, salicylic, retinoic acid etc. can be filtered or purified.

The filtration process and device described herein may also be relevant for the filtration and separation in several other respects, for example in connection with acids, such as for instance glycolic, ferulic, ascorbic, tranexamic, kojic or azelaic acid, or with vitamins such as for instance vitamin A or vitamin C, or other substances as for example aloe vera, arbutin (currant) or dimethylethanolamine.

In the oenological field, the process according to the present invention can be used for decolourisation of beverages, for the extraction of aromatic substances or to remove odour, or to create water and alcohol-based drinks for the extraction of low molecular weight, for instance polyphenols, such as resveratrol. In the field of super-alcoholics to create distillates directly from the extraction of substances retained by the same device. In distillates, including all product resulting from alcohol distillation process (such as for instance acquavite d'uva, cachaça, cognac, gin, grappa, rum, sake, tequila, tapuy, vodka, whisky, etc.) fuselage oils can be removed, and where relevant, for example in the case of grappa, the distillate can be deodorized. Waste water can be treated and cleaned and certain pollutants can be removed. The process of the present invention makes it possible to obtain very clean permeates with a high selectivity of its components and an eluate containing all the aromatic parts and pigments. Furthermore in the wine sector the process can be used for tartaric stabilization or deacidification.

Focusing on the discoloration or deodoration of wines, musts or fruit juices, the process, device and materials described in the present invention has several applications. The process is, for instance, ideal for the treatment of wines with Brettanomyces problems. In line with the requirements imposed by the Regulation (UE) 2018/848, Appendix 10, membrane technology combined with active carbon are needed to treat wines with view to reducing the surplus of 4-ethylphenol acid, 4-methylbutanoic acid, and 3-methylbutanoic acid substances caused by Brettanomyces. The process, device and materials described in the present invention enable to reduce the content of 4 ethylphenol, 4 ethylgluaiacol and 3-methylbutanoic acid of microbial origin which represent an organoleptic defect and masks the original aromatic component of the wine.

To the extent that the process and device illustrated in this invention do not use ionic resins, the invention disclosed in this document guarantees the ability to carry out a series of food processing activities, whether biological or not, without the adoption of chemical processes. Applying mechanical and physical filtration processes that, first of all, do not release micro or nano particles (and therefore do not involve any risk of contamination), the present invention is also compatible, for example, with the rules applicable to organic products, as set out in Regulations (EU) 2018/848, and 2020/464. Thus, regardless of the possibility to use organic resins for wine production and/or infant food, in accordance with the applicable EU organic rules, this invention does not imply the use of transformation additives or process materials that are interdicted, excepting the use of solvents that are involved in the extraction phase, and safeguards the organoleptic characteristics of the product. The present invention therefore makes it possible to proceed with a series of activities of physical filtration and transformation of the matter, including the following:

Treatment with membranes for the grinding of juices, concentrates and musts;
Demineralisation of fruit juices;
Recovery of anthocyanins from grape juice;
Removal of heavy metals from grape juice;
Decalcification, demineralisation and hydrolysis of lactose;
Demineralisation or purification of whey enriched (with protein)—whey contains approximately 50 g/l lactose, protein, beta-carotene, amino acids, organic acids and mineral salts;
a discoloration of brown sugar; and
Extraction/purification of amino acids (glutamic acid, lysine, tryptophan) and beta carotene, lycopene or carotene.

The process, device and materials described in the present invention are ideal to remove odour and unwanted substances, especially removing ochratoxin, octone and geosmin in the musts and beet juice. In that context, the regeneration process could be carried out via soda and a disinfection with OZONE (both in gas and watery form) or oxidizing detergents.

Depending on the material applied, the present invention may have further applications within the oenology, and more generally beverage, sector. For instance, graphene and other materials identified in this invention may be combined or blended within themselves and with polymers, such as Polyvinylpolypyrrolidone (PVPP) or Polyvinylpyrrolidone (PVP) for a number of purposes, including the following ones:

A PVPP based filter like the one described in the present invention may be used in various products and beverages, especially in the world of brewing. The PVPP acts on PNM, in particular on polyphenols responsible for astringency and turbidity (tanno-proteic compounds), thanks to their absorption. The adoption of the process based on a filter composed of PVPP has an important impact on the taste fineness and organoleptic quality of the product, as well as guaranteeing a substantial colloidal stabilization and a reduction in oxidation-degenerative processes. A filter based on PVPP based can be exploited to treat beers or beer styles that are characterized by high tannin levels. Such PVPP filter devices may be exploited to address filtration needs within the process of making the beer, but also at a later stage as exogenous additions of polyphenols in post-production (e.g. cold hops).

A PVPP based filter like the one described in the present invention may be used in various products and beverages, including wine and fruit juices. The PVPP based filter herewith described absorbs oxidized phenolic substances. It has a high and specific adsorption capacity of more oxidized phenolic substances: it is active on catechins, leucoanthocyanins and tannins, i.e. all substances that tend to be removed from wine by colloidal adsorption. Since PVPP is also characterized by the absolute chemical inertia, a filter based on PVPP, like the one described in this invention, is ideal in the treatment of fruit juices, musts and wines, in which it leaves no residues.

In the treatment of white wines, the application of PVPP filters like the one described in this invention, leads to a significant decrease in the ochre-yellow colour given by the oxidized polymers of phenolic substances, thus reducing the effect due to oxidation. In the treatment of red wines, the application of PVPP filters like the one described in this invention, can lead to a slight decrease in red colour, comparable in any case to that caused by similar treatments with protein clarifiers.

The application of a PVPP filter like the one described in this invention facilitates the elimination of the polyphenols responsible for the darkening of white wines, carries out an action on the must preserving the organoleptic qualities and eliminates bitter tastes.

In the environmental sector, the process according to the present invention can be used for the treatment of soil from contaminants and water (including at radioactive sites) or decontamination from heavy metals and other hazardous materials.

According to a preferred embodiment of the invention the filtering and purifying process serves to at least one purpose selected of: recovery of flavorings, in particular terpenes, recovery of organic acids, in particular malic acid, filtration of sugars, purification of hemicellulosic hydrolysates, recovery of polyphenolic substances, purification of drugs as antipyretics, selection or purification of natural drug-like substances, recovery or purification of resveratrol, recovery of plant or algae extracts, filtration or purification of glycolic, salicylic or retinoic acid.

In the petrochemical and refinery sector the filter material according to the present application can be used as adsorbing agent, but also as catalyst and separator.

In the medical sector the process according to the present invention can for instance be utilized in hemodialysis, anesthesiology and hemoperfusion or for the removal of impurities, in desorption processes, light-tight feeding chambers or hemoperfusion cartridges.

Further additional applications in other technical sectors for instance include the removal/extraction of nitrogen, sulfur, oxygen, ammonia, mercury, cadmium, lead, zinc, copper, chromium, carbon dioxide, hydrogen sulfide; the production and stabilization of beer, removal of enzymes/proteins, edible oils, and alcohol (partially present in the current patent text): as a drying agent for gas separation; and for the removal of the aromatic bond from linear paraffin.

For the synthesis of zeolite materials which are suitable for the filter be material according to the present invention, for example at least one selected from the group of the following educt materials can be used: montmorillonite, bentonite, alumina, aluminum-silicate, illite; smectite; and inter-stratified illite-smectite.

As filter bed material alternatively also could be used gold, platinum or silver.

According to a preferred embodiment of the present invention the filter bed may also be composed of materials consisting of a single layer of atoms, known as two-dimensional materials. Examples are the graphene or modified graphene, but also one or more selected from the group comprising borophene, silicone, phosphorene, hexagonal boron nitride or white graphite, germanene and stanene.

All of the above mentioned raw materials for the filter bed should be regarded either in isolation or as a compound in combination between each other, especially, but not only, in combination with granular activated carbon and/or graphene, or chemical carbon or chemically activated vegetable and/or vegetable carbon of organic-origin activated either chemically or via steam, including combinations thereof.

With a filter bed of alternative composition based on a graphene-based material and a zeolite compound or alternatively based on other materials such as those listed in this document, the filtering device of the present invention can find a series of application, including for example the following ones:

Detoxification of aqueous substances by filtration such as beer, wine, cider or other beverages (by distillation). Recovery of organic alcohols/extraction of ethanol from aqueous substances for the dealcoholization of wines, for instance by use of reverse osmosis process and/or by vacuum process. Purification or drying of ethanol, recovery of aromatic substances for pharmaceutical or cosmetic use (by specific enzymes of natural solvents) or recovery of substances with much smaller molecules, such as water. Interaction with several contaminants and/or molecules, and/or compounds, such as for instance, toxins, biological agents, chemical warfare agents, metals, volatile organic compounds (VOC's), tobacco fumes and smoke and tar, combustion gases, harmful vapors and noxious fumes.

The process and devices disclosed in this document may also find additional applications within the pharmaceutical and healthcare sectors, such as for instance the identification and removal of bacteria from a liquid substance that is subject to the filtration procedure. Depending on the material selected for the filter bed, and the membranes applied, the system may be able to detect and, then separate, even extremely small materials. This may also be the case for viruses, including but not limited to the Covid family (hence also the Covid-19) and the SARS. In that respect, a filtration system may be foreseen as part of a drinkable water purification filter device, for particular use in connection with sanitized environments, but also outside and beyond them, for instance in residential or personal use contexts.

According to a preferred embodiment of the invention the dissolved or optionally colloidal substance to be removed is one of the group comprising caffeine, odor substances, coloring substances.

According to a preferred embodiment of the invention the process is carried out with a filtering device comprising the features as it has been described above.

There are many advantages of the filtration device and process according to the present invention, compared to conventional filtration devices known from the prior art, including the following:
  filtration is possible with high working pressures even up to for example 40 bar;
  possible clogging inside the adsorbing material is avoided;
  it is possible to treat liquids even with a high colloidal charge;
  it is possible to proceed with multifunctional filtration systems through one or more receptacles (bells) equipped with different filtering beds, composed of substances specifically selected according to the filtration activity to be carried out;
  regeneration and reactivation of the adsorbing material is easy;
  integrity of the adsorbing material over time is guaranteed despite of the fact that there are micro particles that potentially detach as they are recovered and reinserted in the filter bed;
  the adsorbing material is perfectly sealed inside the filter system without leakage of the same;
  the filter device is easy to clean;
  no preferential routes are created in the adsorbent material;
  different types of adsorbing materials can be inserted and almost no loss of adsorbing material occurs;
  a maximum of regeneration and reactivation of the adsorbing material over time is achieved;
  it is possible to produce huge plants without compromising the final result;
  compared to conventional filtration systems the problem of purchasing of large quantities of coal and binders, which have to be disposed as bottoms/remnants of the traditional coal filtration process, is avoided;
  a high quality end product is obtained;
  production costs are low due to recovery of filter bed material;
  energy consumption of the process is low;
  no chemical agents are used for the separation of desired substances;
  there is a maximum respect for the organoleptic qualities of the treated product.

The filtering device and the filtering process of the present invention provide further possible applications. The various elements of the filter device can act in combination with each other and allow the progressive recovery of noble molecules, and also an improved regeneration of the filtering system, as explained below: After finishing the filtration process, valuable aromas can be recovered by the vacuum system.

For instance the filter bed can be heated to a suitable temperature and then operating under vacuum in order to evaporate substances or aromative molecules of interest that shall be extracted or reused.

Once the aromas have been extracted, the process may continue by detaching form the filter bed the strongest molecules of organic acids with a suitable solvent, for instance ethyl alcohol. This process makes it possible to clean the adsorbent material of the filter bed from acidic substances, which in turn makes the subsequent basic cleaning phase more effective.

Afterwards, the process may continue with the start of a basic detergent (with lye) which allows the removal of organic colouring molecules.

The filter bed of the second filter unit is washed and then regenerated, on site (with the clean in place (CIP) device) without the need to remove and/or replace the filter. To restore the original adsorption capacity of the filter bed, further regeneration (for graphene) or reactivation (for activated carbon) can be carried out outside the plant, after extraction of the filter so that it is regenerated and/or reactivated through a process similar to pyrolysis. The modular and extractable filter bed can then be regenerated repeatedly, and obviously can also be replaced by a new filter system. Replacement may be desirable where the use of alternative material such as zeolite for instance or a special type of carbon is required.

According to the present invention, the rotatable mixing device can be moveable within the receptacle in an axial direction relative to the upper zone of the filter bed. In this case the mixer with the plate could be outside of the filtration bed once the filtration phase is ongoing. In that phase, there will be liquid between the plate and the filtration bed. The mixer could then move down to have the plate and in case also the knives/whisks or a helicoidally shaped dustpan close or even inside the filtration bed, (i) prior to starting the filtration phase in order to reshape the filtration bed, or also (after the conclusion of the filtration phase), (ii) during the phase of the emptying the bell (when air will be pumped into the bell to push the liquid out of the filtration bed and out of the bell and also out of the third filtration stage).

During the emptying phase, the air pumped into the bell from the top, pushing down towards the filtration bed, will push the liquid down. However, the air may enter laterally into the filtration bed and it may create, or increase the size of holes inside the filtration bed, which in turn may (counter-intuitively) result in the upper part of the filtration bed going up (this is because the air filtering inside the lateral part of the filtration bed, along the walls of the bell, or inside filtration bed holes/pathways, will reach air bubbles that formed within the filtration bed, and ultimately the air will crack the filtration bed, hence pushing the upper part of the filtration bed up).

So, for that reason, during the phase of the emptying of the filtration bed (after the filtration phase), the mixer with plate could stay in the downward position, i.e. it will operate as a safety catch, preventing the upper part of the filtration bed to go all the way up to the top of the bell. Importantly, even when the mixer with plate is in the downward position, the plate may still be detached from the filtration bed (with or without knives/whisks/helicoidally shaped dustpan inside the filtration bed). This is because the rotation of the plate causes an air/liquid flux or turbulence that can stir the filtration bed even without being inside it. Hence, preferably there is either liquid or air between the plate and the filtration bed.

Here is another important difference with the approach selected for prior art filters where the filtration media is typically compressed and unmovably blocked into a cartridge or other housing. In that case, the filtration bed is blocked into four walls, whereas according to the invention the receptacle has fixed lateral walls and bottom, but the filtration bed is certainly free above, and in fact it can go up and then go back down to a certain extent (while the plate may operate as said as a safety catch).

As mentioned above the plate operating as a safety catch is the same concept that was explained in connection with the filtration bed, during the aspiration phase, when it is intended to recoup, for instance, the aromas. Also in that case since the filtration bed is free above, and is still wet hence it is a single compacted monolithic block, then the depression sucks the aromas (and cannot suck/detach the particles of graphene/activated carbon as they are all compacted forming the monolithic filtration bed), but ultimately this depression sucks up also the filtration bed as a dingle block, although the filtration bed only goes up to the level where the mixer plate (safety catch) is located. In that respect the filtration bed could be regarded as a sponge, and the mixer plate, to be regarded as a metal cable, that stops the ascension of the filtration bed/sponge. So, also for the phase of (aroma/volatile noble substances) aspiration, the mixer plate preferably would stay in the downward position (as said to operate as a safety catch).

According to a further preferred embodiment of the present invention the process comprises at least one filtering phase, wherein the fluid is passed through the second filter unit and consequently passed through the third filter unit, and at least one regeneration phase, wherein particles detached from the filter bed of the second filter unit are recovered and recirculated to the second filter bed, and/or at least one regeneration phase, wherein the membrane system of the third filter unit is regenerated by means of a cleaning liquid circulated through the third filter unit.

Those features mentioned in the dependent claims refer to preferred embodiments of the present invention. Further advantages of the present invention can be derived from the following detailed description of preferred embodiments and examples.

In the following preferred embodiments of the present invention are described in further detail with reference to the figures of the accompanying drawings, in which:

FIG. 3a shows a schematic representation of a filtering device according to a further alternative embodiment of the present invention;

FIG. 4a shows a more detailed view of a section of the filtering device according to FIG. 2 in a first stage;

Figure 1:
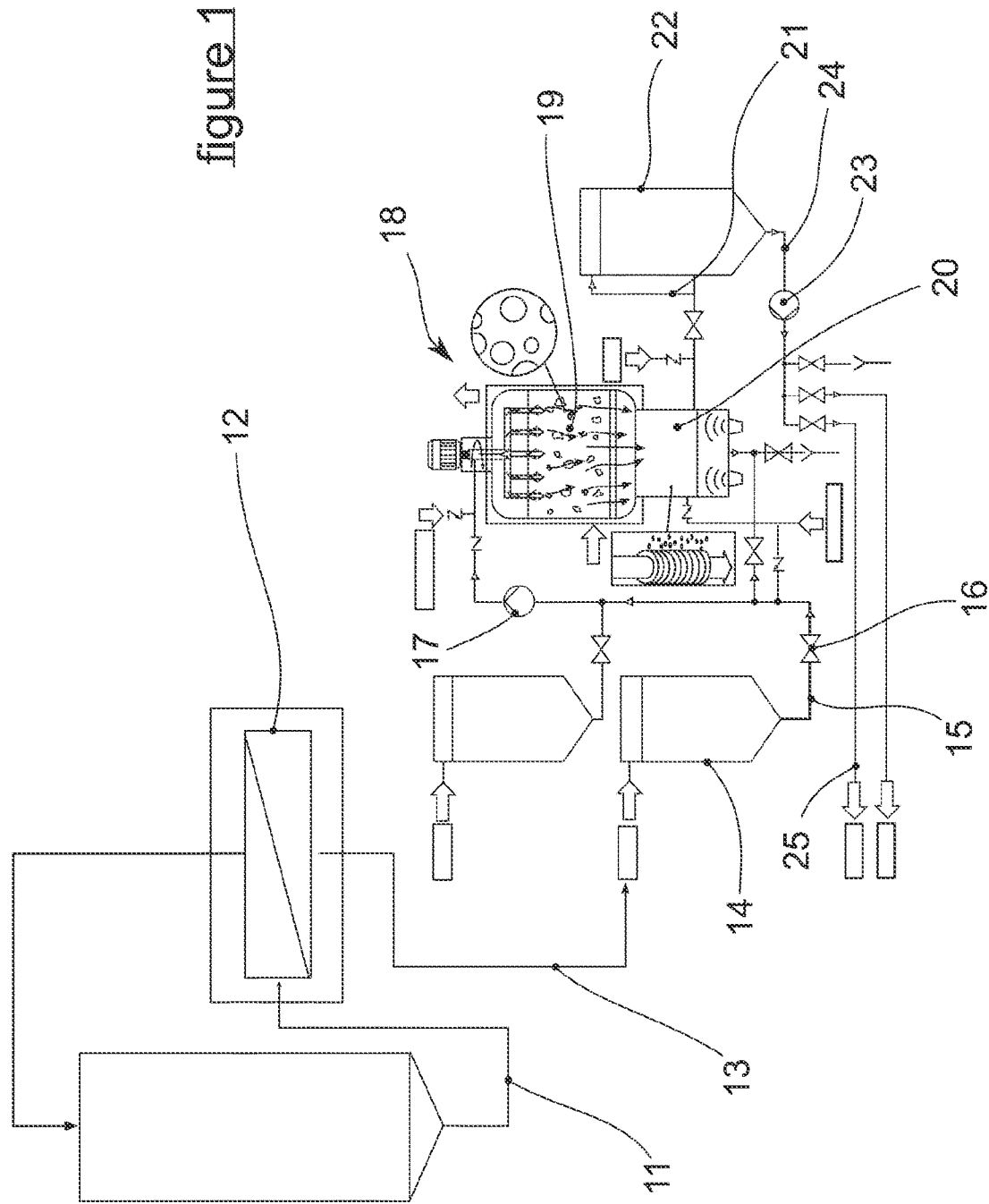
FIG. 1 shows a schematic representation of a filtering device according to a first embodiment of the present invention.

At first we refer to FIG. 1 of the drawings which represents a schematic view of a first embodiment of the present invention. The filtering device comprises a first storage container 10 containing the initial liquid product to be purified. From the bottom of this storage container the initial product is passed via line 11 to a first filter unit 12, wherein a membrane filtration takes place, wherein certain substances having a molecular weight above a defined limit value are removed and the liquid is discoloured to a certain degree. The permeate of this first filtration step is passed through line 13 to a product collection tank 14 and thereafter it is passed via line 15 and open valve 16 by means of pump 17 to a receptacle 18 which receives the second filter unit 19. The second filter unit 19 is a kind of a filter bed and, depending on the actual product to be processed, for example, it may comprises a specific combined filter material of graphene and activated carbon. This filter material at least in part comes as granules. The graphene moiety may comprise graphene-based porous monolithic elements with a percolating macroporous network and accessible meso and micropores as disclosed in WO2018/078427 A1, the disclosure of which is incorporated herein by reference. The filter material may further comprise activated carbon in granular form as a spacing material.

After the passage through the filter bed of the second filter unit 19 the liquid to be purified flows through a third filter unit 20 which can be disposed in a lower part of the same receptacle 18 which also houses the second filter unit 19, such that the third filter unit 20 is disposed downstream of the second filter unit. Said third filter unit comprises at least one porous membrane which for example may be of metal and which is passed by the liquid in a cross-flow manner. Said third filter unit primarily serves to eliminate microparticles which are released from the adsorbent material of the second filter unit by disintegration of said filter material over time. After the passage of the third filter unit 20 the purified liquid flows through line 21 into a product collection tank 22 and from there the treated product may be pumped by means of pump 23 and flow via line 24 to leave the filtration system via output line 25.

Figure 2:
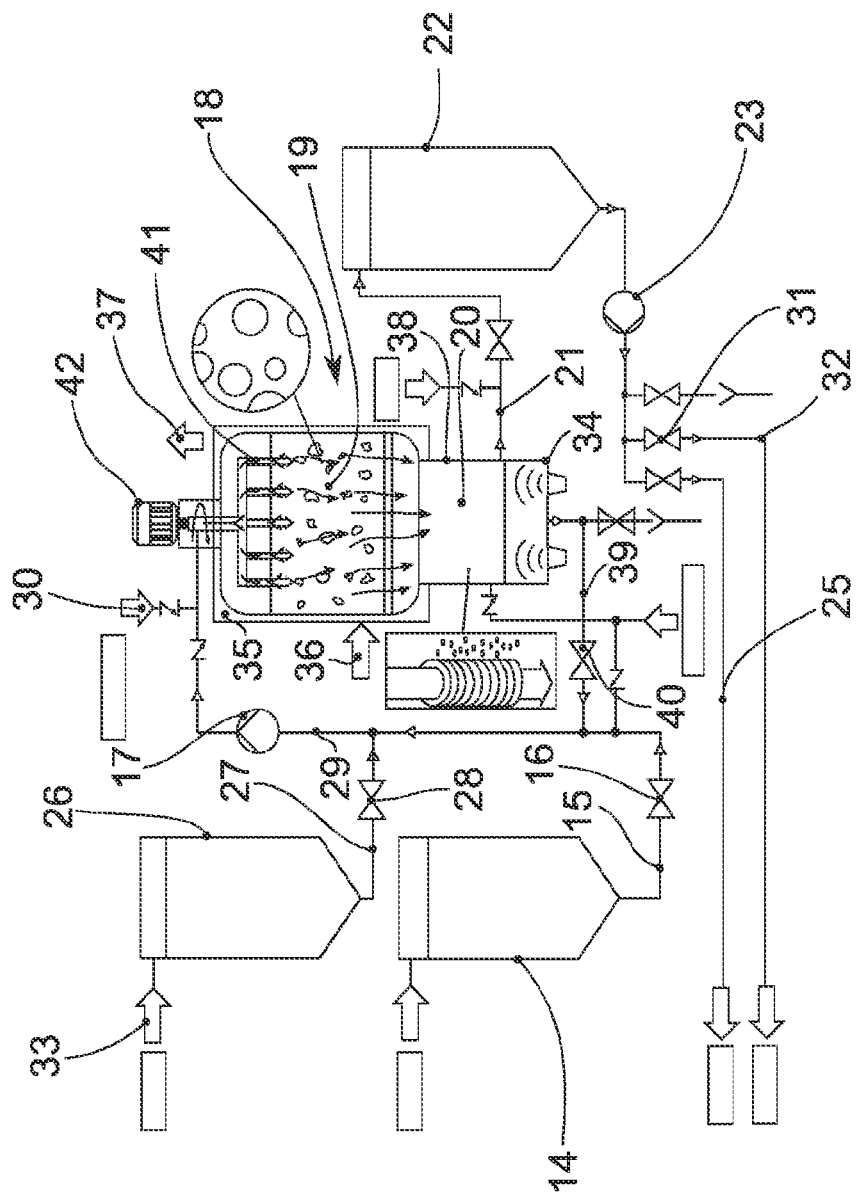
FIG. 2 shows a more detailed view of a part of the filtering device according to FIG. 1.

Hereinafter the various flow passages within the filtration device of the present invention and the various operating modes of the filtration device are explained in further detail with reference to FIG. 2, which represents an enlarged view of a section of FIG. 1. The filtration device comprises a solvent storage tank 26 and a line 27 leading from the bottom region of said solvent storage tank 26 via valve 28 into line 29, wherein pump 17 is disposed which is adapted to pass solvent into the receptacle 18 of the second filter unit, if valve 28 is open. If valve 28 is closed, however, and valve 16 is open, product to be treated from product collection tank 14 can alternatively flow via line 15 and line 29 and can be pumped by means of pump 29 into the receptacle 18 of the second filter unit. In case the filter device has to be cleaned, a clean in place (CIP) device 30 is provided which makes it possible to pass a cleaning liquid into the receptacle 18 in order to clean the second filter unit 19. Said CIP device can be adapted to carry out an automatic cleaning operation, for instance at predetermined moments or after predetermined time intervals. Furthermore an ultrasonic cleaning system 34 is provided for the cleaning of the third filter unit 20.

If solvent from the solvent storage tank 26 and lines 27 and 29 is passed into the filtration system and the system is not in the filtration mode it is possible to recover said solvent by means of pump 23 via open valve 31 into a separate solvent line 32 and either to discharge said solvent or to recover and circulate said solvent back via entry line 33 into solvent storage tank 26.

In order to enable cooling or heating of the second filter unit 19 the receptacle 18 is encased with a kind of cooling or heating jacket 35 with an input line 36 for a cooling or heating medium and a respective output line 37 for said medium, such that the liquid to be purified and the filter bed can be maintained on a predetermined temperature.

After the passage of the filter bed 19 of the second filter unit the liquid flows into the bottom region of the receptacle and flows into the housing 38 of the third filter unit 20, which may be smaller and thus have a smaller cross section than the upper part of the receptacle 18. The housing 38 of the third filter unit may be directly attached to the bottom of the receptacle 18, wherein inside the housing a disc with holes for the passage of the liquid may be horizontally arranged in order to separate the interior of the second filter unit to the third filter unit. The liquid enters the third filter unit 20 in an axial flow first and because of the cross-flow the permeate of the third filter unit then leaves the porous membrane in a radial flow direction via line 21, whereas the retentate leaves the housing 38 of the third filter unit through line 39, then flows through open valve 40 and line 29 back to the second filter unit. Thus the retentate of the third filter unit can be recirculated and pass the second filter unit and the third filter unit several times and thereby becomes more and more concentrated.

Figure 4B:
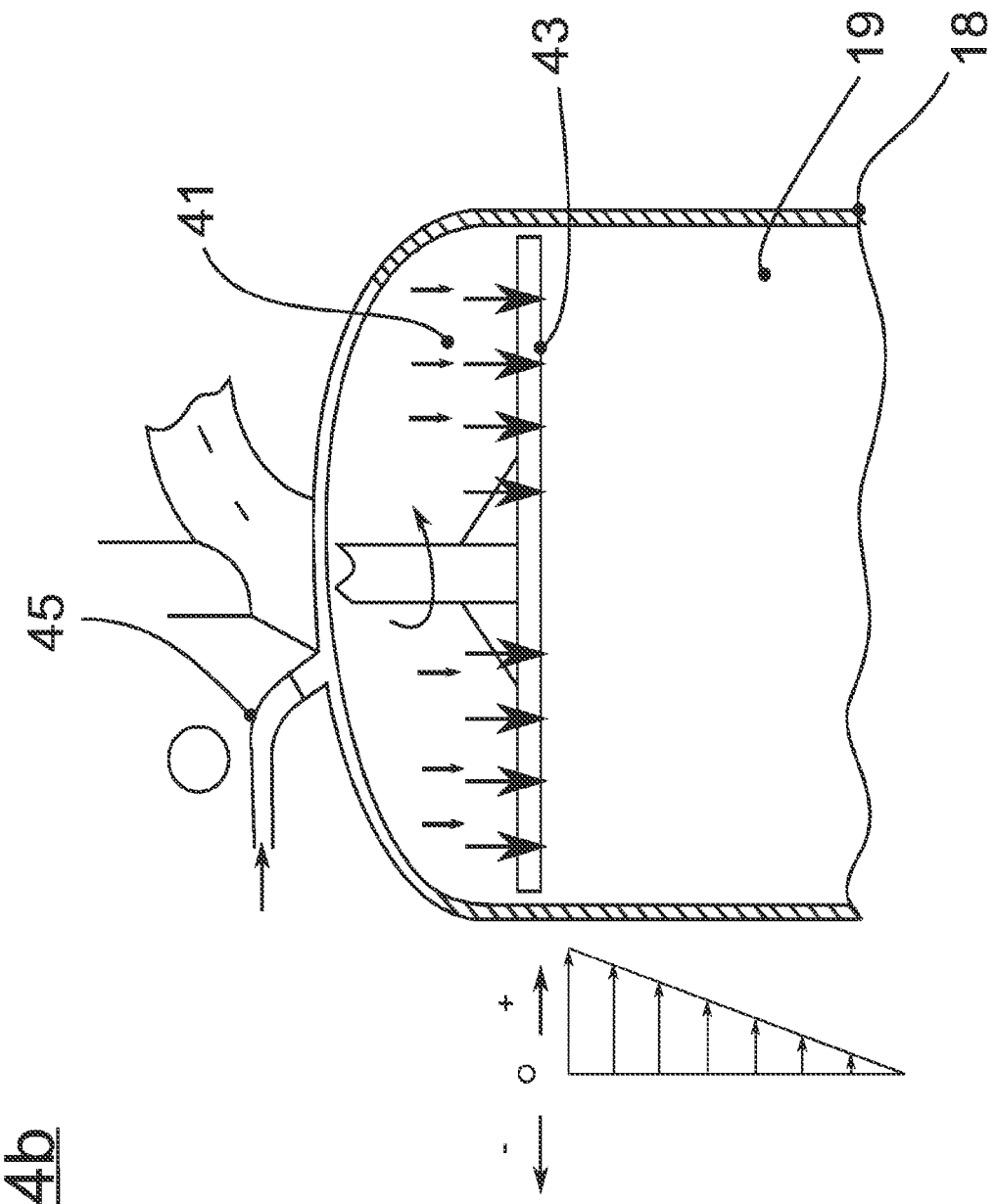
FIG. 4b shows a more detailed view of a section of the filtering device according to FIG. 2 in a second stage.

Within the upper region of the receptacle 18 a mixing device 41 is arranged rotatable around a vertical axis and driven by a motor 42. Said mixing device and its function are described hereafter in further detail by reference to FIGS. 4a and 4b. FIG. 4a shows an upper part of the interior of the receptacle 18 which houses the filter bed of the second filter unit. Above the filter bed 19 a disc-like plate 43 is disposed with slots. The upper end of the receptacle is connected to a vacuum line 44 and is equipped with a vacuum meter 45. By said vacuum line 44 it is possible to withdraw aroma or alcohol from the filter bed by depression. In this case vapours of said substances can pass through slots or holes in the plate 43. In case of a depression in the space above the plate 43 the filter bed is retained by the plate, as the pressure above the plate is lower than in the filter bed 19. Thus in this mode of operation it is possible to recover aroma or volatile substances from the filter unit. The mixing device 41 which includes the plate 43 can be rotated about its vertical axis during this operation as it is shown by the arrow in FIG. 4a.

With the feed, a uniform pressure P is generated in a horizontal line in the upper part, 43. Depending on the flow and the product, an internal speed and a pressure drop is generated by modifying the surface pressure and increasing the packing of the filtering bed, forcing more and more the product to pass and touch more granules of the bed, making the filtration efficient and homogeneous, closing also the possible preferential pathways. As the flow rate decreases, the pressure drop decreases but the crushing remains. The pressure inside the filtering bed can also be managed with the pressure drop of the third stage trap-filter membrane or with the closing of valves at the filter outlet. This causes the product to act with important relative pressure against the granules of the filter bed, and depending on the material adopted, e.g. graphene, carbon, zeolite, pvpp or other material, the adsorption performance of the system may also increases. Concept also valid on the opposite side, i.e. the detachment and cleaning of the filter bed during washing, increasing its efficiency. [Example: feeding the filter at 5 bar, with an outlet pressure of 3 bar, develops a pressure drop of 2 bar. With the same pressure drop and the same speed it is possible to filter with different pressures. For example, with an inlet pressure of 25 bar and an outlet pressure of 23 bar, the pressure drop is always 2 bar, but the pressure acting on the surface of the granules is 20 bar more than in the first case, so each granule undergoes a much higher pressure. Hence, thanks to the applied pressure the liquid can enter more quickly and safely even into the smallest pores deep inside the granules. If the flow generates pressure, vacuum generates depression. Therefore the pressures are reversed and favour the exit of the volatile parts. Thanks to this approach there is no formation of permanent vacant air pockets that would otherwise form inside the fixed filtering bed, generating bubbles, preferential paths and breaks in the filtering state.

FIG. 4b shows a different mode of operation where in the interior space of the receptacle 18 in the upper region above the disc-like plate 43 a pressure is created which is higher than the pressure in the filter bed 19, which is the case during the filtering mode of operation of the device. In this case product to be purified is passed by entry line 29 into the space above the plate 43 such that a fluid level 46 of liquid is created above the plate 43 and filter bed 19. Said fluid then passes through the slots or holes in the plate 43 and flows into the filter bed 19, forced by the pressure created above the plate. The inlet line 29 can be shut by a valve 47 (see FIG. 4a) in the operation mode according to FIG. 4a, if aroma is to be withdrawn from the receptacle.

Figure 4C:
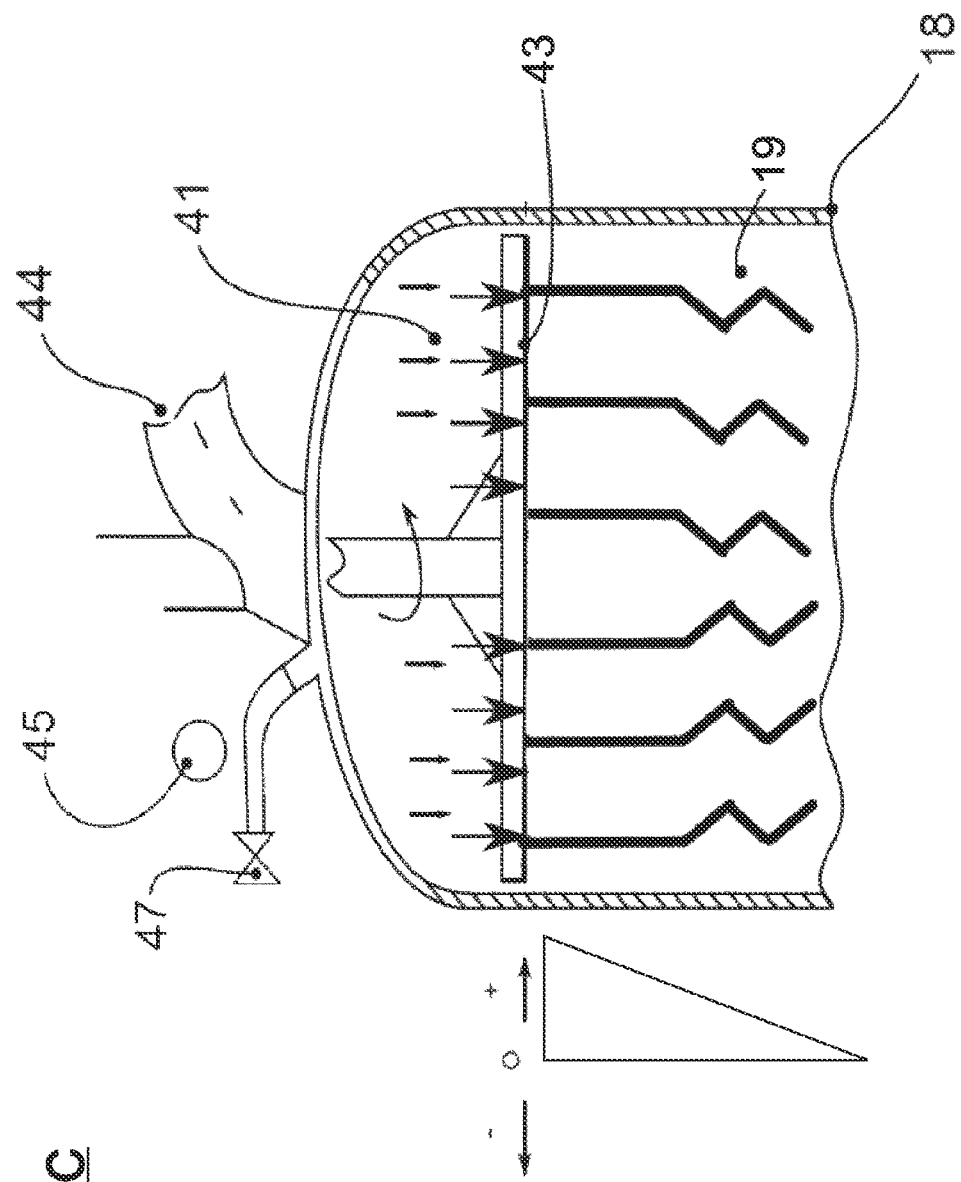
FIG. 4c shows a further detailed view of a section of the filtering device according to FIG. 2.

FIG. 4c shows an upper part of the interior of the receptacle 18 that houses the filter bed of the second filter unit. Above the filter bed 19 there is a disc-like plate 43. This plate is similar to a disc with a similar gatekeeper and/or deep knives at the bottom with variable height depending on the absorbent material used and the application to facilitate the escape of vapours or volatile substances. It is used in case of extraction of absorbent material from the bell 18 through a manhole cover or similar. The upper end of the receptacle is connected to a vacuum line 44 and is equipped with a vacuum meter 45. By said vacuum line 44 it is possible to withdraw aroma or alcohol from the filter bed by depression. In this case vapours of said substances can pass through slots or holes in the plate 43. In case of a depression in the space above the plate 43 the filter bed is retained by the plate, as the pressure above the plate is lower than in the filter bed 19. Thus in this mode of operation it is possible to recover aroma or volatile substances from the filter unit. The mixing device 41, which includes the plate 43, can be rotated about its vertical axis during this operation as it is shown by the arrow in FIG. 4c. Depending on the application, the deep knife rotating and shaking system can rotate 90°, 180° or 360 , and it can rotate in various ways, e.g. in stretches, or in foward/backwards mode. As elaborated above, this approach may be deployed especially for systems requiring the vacuum process to be more effective, but also to facilitate the discharge of wet material in case of regeneration in a very high temperature furnace.

The number 43 represents a perforated rotating plate or a 'wedge-shaped wire' filter system located at the top of the bell just before (i.e. upstream) the second filter stage (consisting of the graphene bed and activated carbon granules). As explained below, the purpose of the plate 43 or wedge wire is not to filter but to shake and therefore change the position of the flakes and granules of composite material that makes up the filter bed (ultimately to solve the problem of preferential routes), to hold the filter bed downstream, and also to deflect the flow of product to be treated.

The level of the filter bed may reach up to the plate 43 or the whisk or stirrer, or it may even exceed that level, and lie above the plate, or it may lie below it. The level depends on the filter media and the product to be filtered. In any case, the objective is to leave a higher volume that allows the uniform distribution of the product that makes up the filter bed. Therefore, the plate is either above or inside the filter bed, depending on the requirements.

Above the plate 43 inside the receptacle (bell) 18, there is a vacuum space (i) where the liquid flows from top to bottom, during the filtration phase, or (ii) where a vacuum is created to suck the volatile parts, for example the aromas, which, thanks to the vacuum, are sucked in during the extraction phase. In any case, the room above the filtering bed is to be considered open upwards, i.e. the filtering system of the second stage, with graphene bed and activated carbon granules, are free upwards.

The system provided before the $2^{nd}$ filter unit, so it could be (i) a rotating perforated plate with slots or holes or (ii) a wedge-shaped wire system.

The liquid to be filtered must enter the area 19 of the receptacle 18 under the plate 43, i.e. the filtering bed, and to do this, holes are provided in case a plate is adopted for the device. In addition, the perforated plate 43 or sheet may cover a smaller area than the inner surface section of the receptacle. Therefore the flow of product to be filtered could pass through the plate 43 or sheet metal (thanks to the holes), but also outside and on the sides of the plate 43.

The pierced plate (as shown by the number 43 in FIG. 4C) works like a mixing device, since knives or whisks or an helicoidally shaped dustpan may start from the plate, which are used to shake, create turbulence, and reposition and recompact the graphene flakes and activated carbon granules.

But optionally according to an alternative solution of the present invention one could exclude the use of the plate, simply 43 using for example a helicoidal whisk without a plate. Or alternatively one could avoid using knives or whisk, keeping only the plate 43 which in that case should be positioned below the level of the filter bed, in order to create turbulence and agitation, and then recreate new balances and changes in the structure of the filter bed.

According to the invention the mixing device could comprise at least one whisk or knives or propellers or even have a gate/retinal shape, with or without plate above it. The main concept to be clearly expressed refers to the effect of turbulence that creates the whisk, being the same in synthesis a stirrer of the filter bed.

In addition, the whisk, especially when fitted with a top plate, also acts as a deflector or diffuser for the flow of liquid to be filtered. In particular, the perforated plate 43 or wedge wire filter system, located upstream of the filtering bed, besides having the function of shaking and stirring the filtering bed, also has the function of acting as a deflector to break the flow of the product to be filtered, which then, falling on the plate, disperses on the filtering bed in a more uniform way (since in case there is only one concentrated flow that arrives directly on the filtering bed, this flow would dig a groove on the filtering bed, reducing the effectiveness of the filtration). Also to ensure uniformity of the flow of liquid to be filtered on the surface of the filter bed in the bell—thus avoiding the problem of creating a furrow in the filter bed—the liquid to be filtered is inserted into the receptacle through one or more funnel-shaped inlet channels (moreover, the receptacle may have a convex bottom).

Finally, the plate 43 may also have another function that is to hold the filter bed, while not fixing it and allowing the continuous modification of the position of the graphene flakes and carbon granules. In particular, after the filtration of the liquid, the wet filter bed becomes compact, and therefore when vacuum and depression are used to extract aromas, the filter bed is sucked upwards. In that case, the plate 43 is also used to keep the filter bed in its original position or to limit its movement within the receptacle 18. If the plate 43 is outside the filter bed, the latter will not be able to move upwards. But the same happens even if the plate 43 is immersed in the filter bed, since it has been compacted, with the plate inside, and therefore it cannot go back up despite being attracted upwards because of the depression generated to suck the aromas. Think, for example, of the filtering bed as a sponge that, once wet, comes upwards, and therefore it could go up again inside the receptacle 18, but it is stopped through a metal cable. So the plate 43 or the whisk placed above or inside the filter bed, in fact, also have the function of blocking the filter bed upwards, because it is impossible to climb back into the upper part of the receptacle 18. In this place, remember that the flakes and granules that make up the filter bed remain free to move and compact each other, especially in the upper part of the filter bed, since there is no real 'plug', nor a structure that compresses and prevents the movements of the material that makes up the filter bed, like a 'straight jacket'.

In conclusion, as said, in the upper part of the receptacle, just before the 2$^{nd}$ filtering unit (with graphene and carbon bed), it is possible to foresee the use of a perforated sheet metal or wedge wire filtering system, but this is not foreseen to allow further filtration, it is instead foreseen to shake the filtering bed, and also to hold the filtering bed downstream, and to deflect the flow of liquid to be filtered. As far as the inventors have provided for a perforated sheet or screen above (or even inside) the filtering bed, above the same is not provided for a hermetic closure that makes the structure fixed and immovable. On the contrary, it is desired to leave the material that makes up the filtering bed free to position and recompact itself, also thanks to the use of the pressure always from top to bottom, and the whisk, as well as the pressure and/or temperature changes that rearrange the flakes and granules that make up the filtering bed.

On the contrary, it is emphasized that the filter bed underneath is stationary and has no possibility to move or grow.

Underneath the filter bed, in particular there is in fact a micro-perforated net and/or filter/wedge wire or membrane support. This net or membrane support is positioned between the 2$^{nd}$ and the 3$^{rd}$ filtering stage, in the lower part of the receptacle. It may have holes for instance ranging in size from 250 microns to 5 nanometres. Below it, instead, is expected, as 3$^{rd}$ stage, the trap filter (which also works as a cross-filter) and could have holes of variable size between for example 0.2 microns and 0.5 nanometers.

Current technologies are based on devices, such as cylinders or other systems, that compact the absorbent material (such as, for example, coal together with graphene). The present invention instead provides a diametrically opposed solution, i.e. it opts to leave the material free in the upper part and block it only in the lower part, this to facilitate the entry of the product into the filter bed, and to keep the upper part level. Even if one tries to press and block the filtering material, it is always complex to do it in an efficient and long-lasting way during the various working phases of the filtering system, since the volume of the filtering bed varies, especially when the filtering bed gets wet or dries (in the first case the filtering bed expands and comes into contact with the surrounding receptacle 18 that contains it, while in the second case it contracts and detaches from the wall of the receptacle 18, so one could talk about a sort of 'sponge' effect).

The granules that make up the filter bed are not stable and with disintegration generate voids. These voids are filled thanks to an agitator or mixing device in the upper region of the receptacle 18 (for instance a whisk-like mixing device) which, by mixing and creating a pressure, allows the uniform dispersion and compactness of the substances that make up the filtering bed on the surface but also in the lower layers, where the substances that make up the filtering bed are pushed between one emptying and the other of the receptacle. Therefore, given the difficulty of blocking the material composing the filtering bed, the present invention takes the opposite approach to contemporary and prevailing technologies, leaving the material composing the filtering bed voluntarily free to position itself and compact itself progressively in a dynamic way. This approach allows the filter system to be used with any absorbent compound, since the system adapts to the characteristics of the material selected to compose the filter bed. The system fed from top to bottom with a free (upper) part offers considerable advantages as elaborated below. By feeding through the inlet 45 and by stirring action in the upper part 41 a kind of cushion of product mixed with absorbent material is formed, which remains in suspension and which will then deposit in a dynamic way, closing every preferential pathway that may have formed during the emptying. This makes it possible to compact the filter bed, 19, keeping it adherent to the wall of the receptacle 18.

Figure 4D:
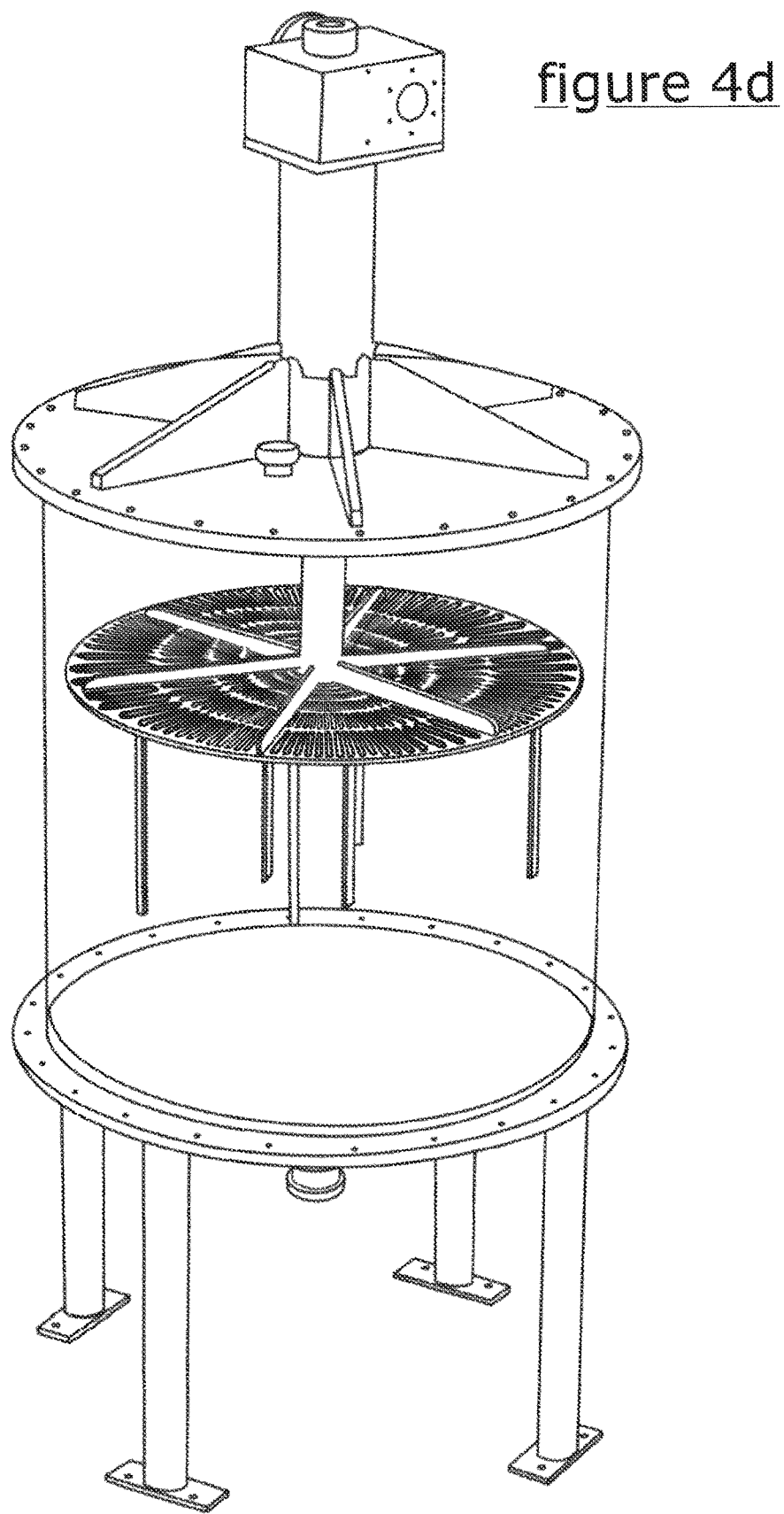
FIG. 4d shows a schematic perspective view of a part of the filtering device with the receptacle for the second filter unit according to an embodiment of the present invention.

In the following, we refer to FIG. 4d, which shows in a schematic perspective view a part of the filtering device, namely the receptacle 18, which comprises the second filter unit and the mixing device, in a slightly altered embodiment of the present invention. There is a circular disc-like plate 43, which is disposed within the receptacle 18 and which forms part of the mixing device 41. The disc-like plate 43 is mounted on the lower end of a rotatable stem 56, which itself is axially moveable up and down within the cylindrical receptacle 18. This axial movement is performed by means of either a piston within a hydraulic cylinder, a threaded spindle or an elevating screw within a housing 57 serving as driving device, which is mounted in the upper region of the receptacle or above the receptacle 18. On the lower side of the disc-like plate 43 knifes, stirring staffs or similar mixing elements 58 protrude and extend into the filter material of the filter bed, which is not shown in FIG. 4d, at least, when the disc-like plate 43 is in an axially lower position. Apart from its mixing up function the disc-like plate 43 of the mixing device 41 can serve to compress the granular filter material of the filter bed, when the disc-like plate is axially moved downward and it serves as well as a device to pressurize the liquid to be filtered through the filter bed. The receptacle 18 may comprise a ground plate 59 in its lower end region as well as a cover plate 60 in its top region, on which the housing 57 of the driving device is arranged. The cover plate 60 can be removable in order to open the receptacle, for instance for reasons of revision or exchange of the filter material. Pipes, conducts, connections and valves to convey the liquid into the receptacle and out of the receptacle 18 are not shown in FIG. 4d for reasons of clarity.

Figure 2A:
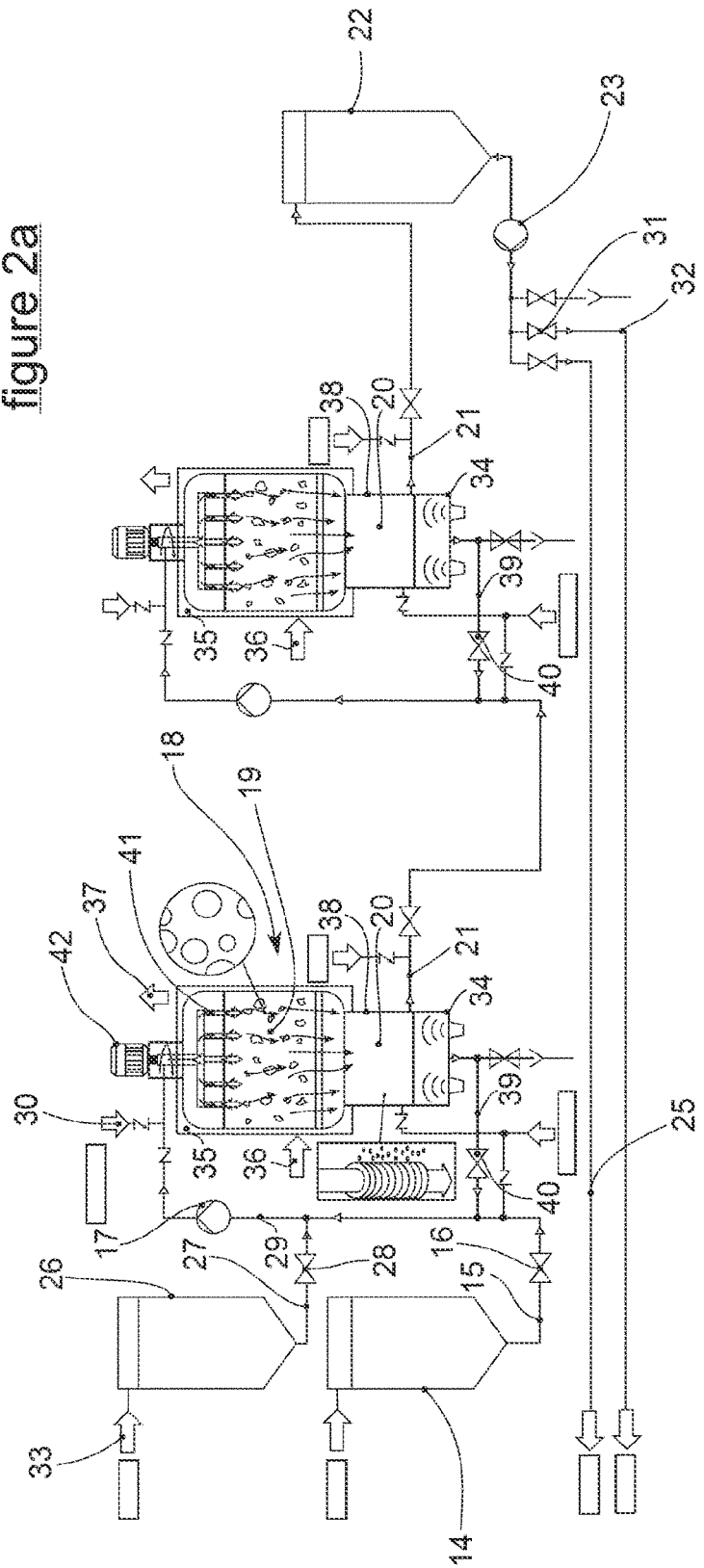
FIG. 2a shows a more detailed view of a part of the filtering device according to an alternative embodiment of the present invention.

In the following, we refer to FIG. 2a which discloses an alternative embodiment of the present invention, wherein two receptacles 18 of the kind described in FIG. 2 above have been connected in series. Each of these receptacles comprise a second filter unit 19 and a third filter unit 53, respectively.

In the following, referring to FIG. 3a filtering device according to an alternative embodiment of the present is described in further detail. Similar to the embodiment of FIG. 1, the filtering device comprises a first storage container 10 containing the initial liquid product to be purified. From the bottom of this storage container 10 the initial product is passed via line 11 to a first filter unit 12, wherein a membrane filtration takes place, wherein certain substances having a molecular weight above a defined limit value are removed and the liquid is discoloured to a certain degree. The permeate of this first filtration step is passed through line 13 to a product collection tank 14 and thereafter it is passed via line 15 and open valve 16 by means of pump 17 and via open valve 50 to a first receptacle 18 which receives the second filter unit 19. The second filter unit 19 can for instance comprise a similar filter bed as described in the embodiment of FIG. 1. Different to the embodiment of FIG. 1 in this case the filtering device comprises a second receptacle 51 which may contain another second filter unit 19 with a similar filter bed as the first receptacle 18 contains. The purpose of this arrangement is to operate both second filter units alternatively, which means a filtering operation can take place within the second receptacle 51 while the first receptacle 18 is operated in a cleaning mode. This has the advantage that the filtering process can proceed continuously without any need of interruption. Thus if valve 50 is closed the permeate of the first filter unit 12 can be passed through open valve 52 into the second receptacle 51 and passed through the second filter bed 19 disposed therein. After said filtering operation a membrane filtering step in cross-flow can follow in a third filter unit 53 comprised within the second receptacle 51 and thereafter the permeate of the third filter unit 53 can either be recycled to the entry line of the second receptacle or it is passed via open valve 54 and line 55 to product collection tank 22 from which it may leave the filtering device by output line 25. The filtering process within the second receptacle 51 thus can be carried several times by passing the permeate of the third filter unit 53 within the second receptacle back to the entry line of this receptacle, which means the liquid to be purified is recirculated and passed through the same filtering device several times as described above. Consequently, by using an arrangement with two receptacles, each comprising a second filter unit and a third filter unit, both receptacles may be operated in parallel, providing a continuous filtering process, wherein a cleaning process is involved in one of the two similar receptacles during the filtering mode of the other receptacle.

Figure 3:
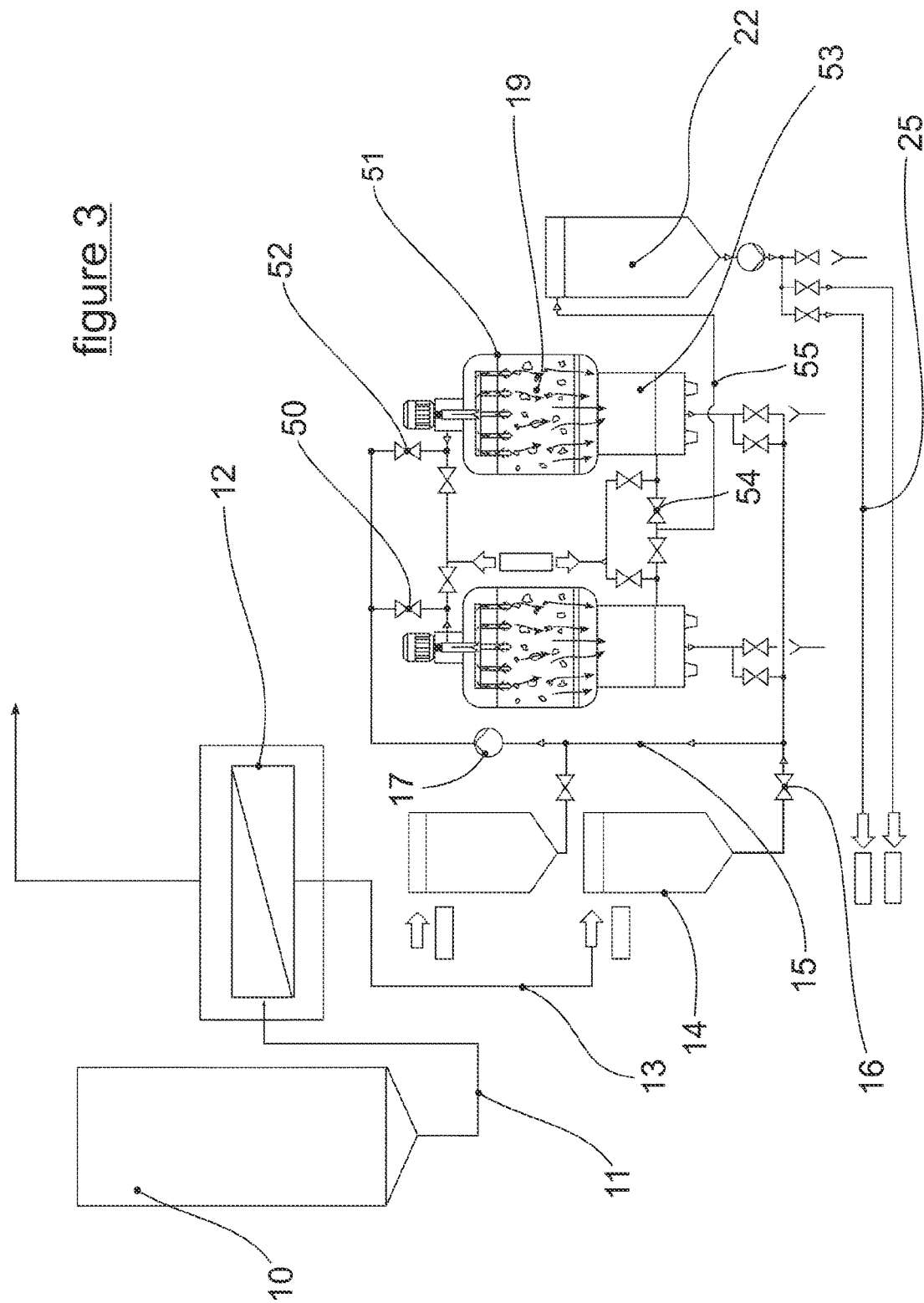
FIG. 3 shows a schematic representation of a filtering device according to a second alternative embodiment of the present invention.

It is, however, also possible to operate a filtering device as disclosed in FIG. 3 in a different manner, wherein the liquid to be purified is first passed through the second filter unit and the third filter unit within the first receptacle 18 and thereafter it is passed through the second filter unit 19 and the third filter unit 53 within the second receptacle 51 for a further improvement of the whole filtering process. In this case the liquid to be purified enters the first receptacle 18 via valve 50 and after completion of the filtering process in this receptacle 18 valve 50 is closed and valve 52 is opened such that the liquid to be purified further undergoes a supplemental filtering process within the second receptacle 51 before it is passed into product collection tank 22. This variation can for instance have the advantage that different filter materials can be used within the filter beds of the two second filter units and/or different cross-flow membranes can be used in the two receptacles 18 and 51, in order to further improve the whole filtering process. In this case it would particularly be possible to remove different molecules from the liquid to be purified in each of the two receptacles 18 and 51.

In the following, referring to FIG. 3a, an embodiment according to a further alternative of the present invention is described. Compared to the variant of FIG. 3, in FIG. 3a there are two similar units of filtering devices, which each have two receptacles 18 arranged similar to the embodiment of FIG. 3 described above, wherein both units are arranged in series. Thus there is a total of four receptacles 18, each comprising a second filter unit 19 and a third filter unit 53 and in each of both units the filtering devices can be operated alternatively, one being in a filtering mode whereas the other is in a cleaning mode. After the passage of the two receptacles of the first unit the liquid to be treated is passed through the second filtering device with again two receptacles, operating as described above.

Figure 5:
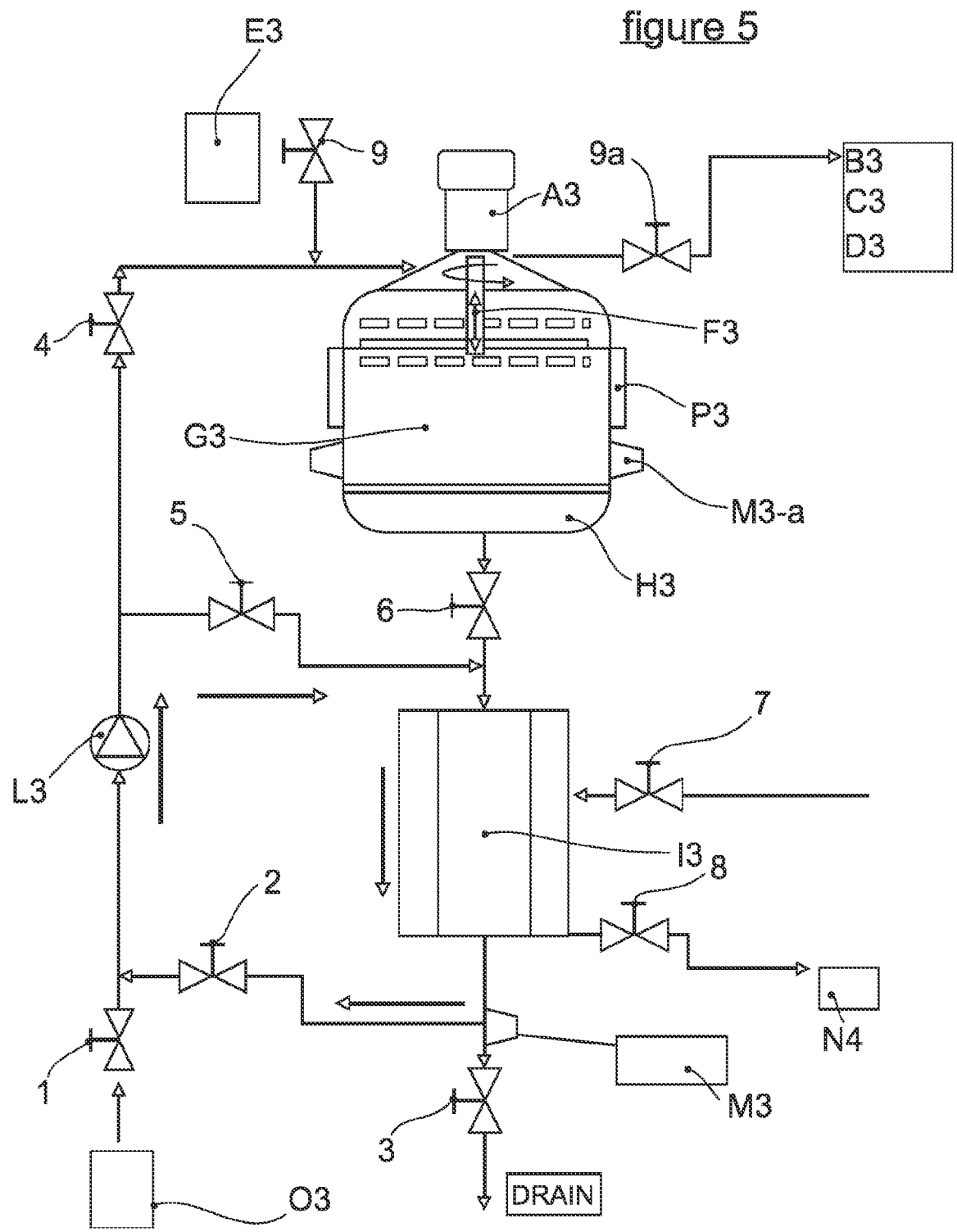
FIG. 5 shows a schematic representation of a filtration system according to an alternative embodiment of the present invention.

In the following, we refer to FIG. 5 showing a schematic representation of a filtration system according to the present invention. Referring to FIG. 5 we explain an exemplary operating mode of a filtering device according an embodiment of the present invention.

Filling and Filtration Phase

The product to be treated enters through the inlet O3, which by opening the valve 1 is pumped by the pump L3 that goes up to the interception valve 4 to enter the receptacle which houses the filter bed G3 of the second filter unit (also see filter unit 19 above). The upper part being full of air is vented through the valve 9a, during and until it is completely filled. During this phase, the mixer or surface agitation system is activated and, with its action, it repositions and reshapes the filtration media contained located in G3. Depending on the application, the mixer or self-levelling system can rotate and or descend for short distances in order to facilitate the uniform distribution of the filtration media throughout the surface of the filtering bed. The mixer or self-levelling tool can go up and down using the A3 screw motor or a piston system.

Filtration continues by feeding the third stage through the valve 6, and in turn forcing the liquid to enter down the i3 stage (see also third filter unit 20 above), while valve 5 is closed. Stage i3 forces any particles of material that detach from G3, and are not caught by the H3 filtering net, to remain in the dirty part and to precipitate downwards between the closed valves 2 and 3. At this point, the purified, clear, product crosses the trap-filter and goes out through valve 8.

In case of special products (such as edible oils or other) or where an aggressive regenerating/cleaning is necessary, the filtering bed may be heated or refrigerated by means of steam or refrigerant liquid passing through the P3 cavities. If, on the other hand, it is necessary to shake or compact the filtering materials of the filter bed (e.g. carbon, graphene, zeolites, polymers, compounds, metals, alloys, fiber, glass, etc. etc.), then the M3 ultrasonic or pneumatic vibrating system is activated.

Particle Recovery, Filtration Bed Reintegration and System Regeneration

Once completed the filtering phase, the product is pushed out of the receptacle by inserting gas from the inlet O3 or by a dedicated valve inserted in the pipe between the pump L3 and valve 1. The gas runs along the same path as the liquid during filtration. The gas pushes the filtered product out of the bell (see also receptacle 18 above). In this phase, the mixer or self-levelling system will support the upper part of the G3 filtration bed, which in turn favors the expulsion of liquid and gas.

Once emptied, the system is regenerated thanks to the cip system. In every moment or in every phase both of filtration and regeneration or washing or counter-washing of the I3 stage (with cross-flow), it is possible to recover the particulate or fine dust that detach from the G3 filtration bed thanks to a recirculation and recycling process that takes place through the outlined sequence.

Valve 1 is closed (and equally valves 7 and 8 are closed but for the flushing phase), while valve 2 is opened. As such, the product exiting from I3 passes through the L3 pump which—thanks to the operation of the ultrasonic or pneumatic vibration system—puts the particles back into suspension. The particles are then dragged by the flow through valve 4 and they therefore return to the upper part of the receptacle. The recouped matter is therefore recycled so as to reform and reintegrate the filtration bed.

Once the particulate matter has been recovered, at the end of the above-referred recycling phase, stage I3 can be regenerated thanks to the crossflow system, which operates (i) by opening valves 2, 5 and 8, while closing valves 4, 6, 3 and 7, and (ii) by having water or other liquid coming from a recirculation system (where the liquid enters through O3 and valve 1, and it recirculates on itself, passing through stage I3, thanks to the L3 pump).

When the time wash/cleaning phase is completed, all dirty water/liquid is discharged through valve 3, possibly also using a backwash system that injects water at specific pressure, operated by an external pump through valve 7, which is opened, while keeping closed valves 2, 5, 6 and 8 (hence enabling the flow to be discharged still through valve 3, which is open).

Example 1—Apple Juice Filtration Through a Filter Device with a Filter Bed Comprising Graphene and Activated Vegetable Carbon In a preliminary roughing filter stage apple juice was filtered through a first filter unit according to the present invention comprising a microfiltration through a suitable membrane. After this first filtering step a clear and colloid-free liquid was received. The permeate of this first filter unit was thereafter passed through a decolouration device, after which a liquid product with a yellowish colour was obtained.

Then in the next step said liquid was passed through a filter bed of a second filter unit comprising graphene and activated carbon. By this further filter operation a further decolouration was reached and polyphenols and malic acid were extracted from the apple juice, which substances were retained in the filter bed. At the end of the filtration phase the filter bed was washed with water to recover sugar or juice residues and to regenerate the filter bed material for a new cycle.

If malic acid or flavorings were not to be recovered, the process involved only one cleaning phase. Where the malic acid was to be recovered, regeneration involved the recovery of the fraction of organic acids that were retained in the filter bed of the second filter unit. For this recovery, a hydroalcoholic solution contained in the solvent storage tank (see reference number 26 above) was passed through the filter bed of the second filter unit, which then detached the acid molecules from the filter bed and the resulting solution was pumped to a distillation column where the process allowed the malic acid, aromas, or other substances to be removed from the alcohol. Then the solvent, in this case alcohol, was pumped back to the solvent storage tank. After the filtration step through the filter bed of the second filter unit an almost colourless clear liquid was recovered. After the recovery of the malic acid a washing with soda was conducted, to completely generate the filter bed of the second filter unit, whereby the colour of the solution resulting from the washing step was very dark.

Instead of soda, specific enzymes or natural solvents may also be used to recover further noble polyphenolic molecules such as flavonoids known as procyanidins, proanthocyanidins, leucoanthocynidins, piconogenols, tannins, etc.

Example 2—Separation of Sugars in a Raw Sugar Solution from Colloidal Parts, Pigments and Macromolecules 2.75 litres of a raw sugar solution were filtered out. The filtration was completed without problems of clogging and without the need to wash the filter bed. A very dark concentrated product was obtained as retentate and a clean straw-yellow permeate was obtained. Tests carried out with different filter materials in the filter bed showed that a filter material comprising chemically activated carbon produced better results than the use of steam-activated carbon. The dosage of carbon required was about 0.5 to 1%. The result was excellent, obtaining a clear juice similar to water. After filtration, a concentration test was simulated, which was positive. The juice obtained as permeate was a clear, slightly straw-yellow liquid, brought to a concentration of up to 70 brix. Due to the high sucrose content, the sugar crystallised naturally. It could be shown the goodness of the purification process according to the present invention, because sugar contained in a solution inside a container crystallised in a natural way, simply by putting the product in the air.

Example 3—Different Filter Materials for the Filter Bed of the Second Filter Unit In this example a couple of experiments were carried out using the filtering device and the process according to the present invention, wherein different materials were used for the filter bed of the second filter unit in various filtering applications. In the following table 1, the effects and the specific conditions in the filtering process are listed.

TABLE 1

| Filter material | | | | | 2 stage | | |
| --- | --- | --- | --- | --- | --- | --- | --- |
| Type | Application | Process description | Effect | 1 stage Preferred Cut-Off | Process in the filter bed of the second filter unit | Regeneration | 3 stage |
| Graphene (functionalized) + Vegetable steam activated carbon | purification of fruit juice | After bleaching the product, the sugary product coming out of the permeate of the first filter unit is filtered through the second filter unit; Passing through it, all aromatic or polar substances such as flavorings or high molecular weight organic acids are retained by the filter material. | bleaching | 0.2 Micron to 300 KD | Adsorption of phenolic or polar substances or virus/bacteria or pasteurization | soda | trap filter |

TABLE 1-continued

| | Filter material | | | 1 stage | 2 stage | | |
| --- | --- | --- | --- | --- | --- | --- | --- |
| | | | | | Process in the | | |
| Type | Application | Process description | Effect | Preferred Cut-Off | filter bed of the second filter unit | Regeneration | 3 stage |
| | recovery of phenolic substances polyphenols and anthocyanins | After an initial fractionation the second filter unit has the ability to retain all small polyphenol molecules such as anthocyanins procyanadins and polyphenols. It is possible to regenerate the system with alcohol (ethanol) or another organic solvent such as glycerol or a solution diluted with alcohol glycerol and water. The process allows to recover aromatic or polyphenolic substances in a non-invasive way. | filtration | 0.1 Micron at 300 KD | adsorption of phenolic or polar substances | alcohol or organic solvents periodically washing with soda | trap filter |
| | brettanomyces purification on process or wash water or final product | In connection with an aqueous solution derived from food production or with a washing liquid, filtration enables to retain such substances such as brett. In the oenological sector, not only the washing water, but also the product itself can be purified, once filtered the permeate no longer contains brett. | bleaching | 0.1 Micron at 500 KD | adsorption of phenolic or polar substances | alcohol or organic solvents periodically washing with soda | trap filter |
| | recovery of high molecular weight acid fractions such as malic or tartaric | The bleached food solution or liquid may be treated in order to reduce the fraction of acid compounds present. | bleaching | 300 KD | adsorption of phenolic or polar substances | alcohol or organic solvents periodically washing with soda | trap filter |
| Graphene (functionalized) + Zeolite | filtration of positive metal ions and alcohols | Products containing alcohol or hydro-alcoholic solutions are treated with zeolite to partially or fully remove the alcohol from the products or to recompose products after an evaporation phase | products in hydroalcoholic solution | 0.1 Micron at 500 Daltons | adsorption of phenolic or polar substances | regeneration with soda detergents or by vacuum evaporation | trap filter |
| Graphene (functionalized) + PVPP | Recovery of phenolic substances, purification of oxidation of | The filter material of the second filter unit has the ability to retain all small polyphenol | bleaching | 0.8 Micron | adsorption of molecules such as flavones and small polyphenols | alcohol or organic solvents periodically washing | trap filter |

TABLE 1-continued

| Filter material | | | | 1 stage | 2 stage | | 3 stage |
|---|---|---|---|---|---|---|---|
| | | | | | Process in the | | |
| Type | Application | Process description | Effect | Preferred Cut-Off | filter bed of the second filter unit | Regeneration | |
| | sugar products and purification from aflatoxins or components resulting from oxidation such as certain flavonoids catechins and epicatechins and beer stabiliser | molecules such as anthocyanins procyanadins and low-dimensional polyphenols as oxidised molecules that give unpleasant aromas to the final product. | | | | with soda | |
| Graphene (functionalized) + PP or Pa66 or PVDF or PES | Water filtration and desalination with removal of contaminants | once the solid parts have been removed or most of the salts have been removed by filtration, the water can remove the salt ion particles by passing through the second filter unit | bleaching | 0.2 Micron at ROV | adsorption of ions of salts such as potassium sodium and the like | alcohol or organic solvents periodically washing with soda | trap filter |
| Graphene (functionalized) + Silver, silver chloride, + silver oxide | More selective and sterile filtration | | bleaching | 0.2 Micron | adsorption of phenolic or polar substances | alcohol or organic solvents periodically washing with soda | trap filter |
| Graphene (functionalized) + Diatomaceous earth or Cellulose (kieselguhr) in 1.0-3.0 mm granular version | General liquid filtration | With average absorption of non-inorganic but soluble colloidal substances | bleaching | 0.2 Micron | adsorption of phenolic or polar substances | alcohol or organic solvents periodically washing with soda | trap filter |

An additional advantage of the process of the present invention is its environmental friendliness. For instance it is to emphasize that the invention does not use ionic and cationic exchangers. The invention does not use toxic chemicals, and thus it can be used for organic production. There is no need to solve the problem of disposal of particles, as the invention uses the trap filter of the third filter unit. The invention does not operate in the traditional way in which carbon was used, and once exhausted it had to be disposed. The invention is greener and more sustainable, as it uses regeneration, for example, simply via 'soda' as opposed to aggressive acids.

Activated carbon currently used in the food sector, for instance for water purification, is sold in powder form or in granules, depending on the application. Powder is a very fine powder that has little or no filtering capacity (as it does not form a cake, through which the liquid is supposed to pass in order to be filtered out). Once used, the powder is thrown away. Granulate filters do have a filtering capacity, which is why they are used as safety filters. When used for certain applications, such as in water or similar liquids, once they have been used up they can be regenerated (typically, via an external oven, not in place). Granulate filter have a low pressure drop, which means that they do not perform as well as they are not as porous as powder filters.

Granules are used in a similar way to resins. Instead, powder is added to large masses of liquid, 150, 500, 1000 hectolitres, for instance, in percentages of 1-3% up to 150 gr/hl. Powder is decanted together with other technological aids, such as bentonite or others, and it is added and left to decant precisely because it cannot be as effective as granular filters. Since decantation is not enough, the process requires a second step, usually microfiltration or centrifugation to remove the micro particles visible in suspension.

Coal powder can also be combined with diatomaceous earth or cellulose, fossil flour, generally identified as filter aids, increasing the degree of filtration, where both the carbon and the flour are dosed in line during filtration.

In general, these products need storage, dust safety protocols for the operator using them, and after decanting the said products must be managed as waste and disposed of.

Activated carbon is chemically or steam-activated, giving it a specific porous morphology which, depending on its activation, lends itself to retaining different types of molecules such as color, (brett) odors, contaminants or poisons.

The compound that the present invention uses as a filtration bed for certain preferred embodiments may include, for instance, graphene combined with granular activated carbons (which is not a resin-based compound). This compound lends itself to being filtered and regenerated, hence without having the problem of the disposal. The system based on the said compound is clean in the sense that particles of graphene or carbon are removed from the permeate due to the operation of a trap filter that safely closes the filtration system. So, this approach is safer, greener and more efficient than traditional use of powder or granular carbon, as explained above.

Some of the key aspects of the invention, we reiterate, include the following:

The receptacle (bell) of the second filter unit is combined with the roughing stage of the first filter unit, and the trap filter of the third filter unit to remove any micro-particles, where the porosity of the trap filter depends on the substances to be filtered, and typically ranges from 0.5 micron to 0.5 kd. The filter process within the third filter unit does not involve a reverse osmosis (as in the prior art document WO 2015/034776 A1, where the reverse osmosis has the aim of concentrating the sugars), instead it involves a safety procedure to remove micro-particle that may be detached from the filtration bed. The said prior art document points to ionic and cationic exchange resins (sieve) and related housing, hence a system that is similar to the one used for rectified juices and sweeteners that go through a carbon, bentonite based filter for removal of proteins, odors, color and salt via resins and subsequent concentration starting with the reverse osmosis.

According to the present invention, the fluid is always fed from top to bottom (different to WO 2018/078427 A1, which is characterized by the opposite approach, where the fluid to be filtered out is injected from the bottom).

Because the 'ceiling' above the filter bed is free, the invention manages the inlet pressure and pressure drop within the filter bed material of the second filter unit in accordance with the particle size of the filter bed material, which in turn affects the crossing speed of the liquid to be filtered.

The invention uses the specific mixing device in all cases where the filter bed becomes compact and dogged, mixing it in order to reduce the weight, to remove the cohesion between the granules and to reduce the pressure drop so in the filter bed, so that the system can be washed without problems.

The system involves a variable mechanical pressure, in particular the invention uses an upper plate of the mixing device that exerts pressure according to the material and holds it in place during gas emptying.

Thanks to the heating and cooling system, it is possible to heat or cool the chamber in order to filter special liquids such as thickeners or similar. The heating system is also used to dry the filtration bed, and to support with the particle extraction and sanitizing process. The cooling system may be instrumental for the filtration of grappa at low temperature so as to retain waxes, or oils or products that must be maintained cold so as to avoid their deterioration.

A vacuum system is also available in case it is necessary to recover alcohol or highly volatile molecules.

Ultrasounds could be used in particular in connection with stainless steel membranes to make the particles flow downwards and clean the membrane or to move or make the small graphene particles adhere more to the wall in order to limit the wall effect during filtration, i.e. to prevent the product from passing close to the wall rather than through the filtering material or bed.

Depending on the specific needs of the envisaged filtration system, the latter may involve a number of receptacles with respective second filter unit that operate in alternate mode or in a continuous mode, in parallel or in series.

LIST OF REFERENCE NUMBERS 1 valve
2 valve
3 valve
4 valve
5 valve
6 valve
7 valve
8 valve
9 valve
9a valve
A3 levelling compound mixer
B3 cold water
C3 aromas or alcohol
D3 vacuum pump
E3 clean in place (CIP) system (water with soda or acid)
F3 mechanical agitator
G3 graphene filter and absorbent/adsorbent bed
H3 perforated filter plate
I3 porous membranes
L3 pump
M3 ultrasound, ultrasonic or vibration system
N4 product output
O3 product input
P3 surrounding air gap with insulation
10 first storage container
11 line
12 first filter unit
13 line
14 product collection tank
15 line
16 valve
17 pump
18 receptacle
19 second filter unit
20 third filter unit
21 line
22 product collection tank
23 pump
24 line
25 output line
26 solvent storage tank
27 line
28 valve
29 line
30 clean in place device (CIP)
31 valve
32 solvent line
33 entry line
34 ultrasonic cleaning system
35 cooling or heating jacket
36 input line
37 output line
38 housing of the third filter unit
39 line
40 valve
41 mixing device
42 motor
43 disc-like plate
44 vacuum line
45 vacuum meter
46 fluid level
47 valve
50 valve
51 second receptacle
52 valve 53 third filter unit
54 valve
55 line
56 rotatable stem
57 housing for elevating screw or piston
58 stirring or mixing elements
59 ground plate
60 cover plate

The invention claimed is:

1. A filtering device for filtering a fluid, comprising
(i) at least one first filter unit serving to remove substances in a first filtering step by way of a membrane filtration comprising a microfiltration and/or an ultrafiltration and/or a nanofiltration membrane, said removed substances having a molecular weight above a defined limit value, resulting in a permeate of the first filter unit mainly containing low molecular weight molecules;
(ii) a second filter unit, disposed downstream of the first filter unit, for the treatment of the permeate of the first filter unit,
wherein the filtering device comprises a mixing device within a receptacle containing the second filter unit,
wherein the second filter unit comprises a filter bed comprising at least one particle filter material, the at least one filter material of the group comprising graphene and activated carbon forming a filtration bed formed from compacted particles in the form of graphene flakes and activated carbon granules;
and
(iii) a third filter unit, disposed downstream of the second filter unit, for the treatment of the permeate of the second filter unit, wherein the third filter unit comprises a porous membrane,
wherein, with a view to the second filter unit, there is a void above the filter bed between the filter bed itself and any further structure which forms part of the receptacle, which receives the filter bed;
wherein the mixing device is rotatable about a vertical axis and drive connected to a motor and wherein the rotatable mixing device;
(a) is moveable within the receptacle in an axial direction relative to an upoer zone of the filter bed;
(b) comprising a disc-like plate with holes and slots for passing the fluid to the filter bed; and
(c) knifes extending along the axial direction from a lower surface of the plate extend into the filter bed
wherein;
when the filtration process is in operation;
the rotatable mixing device is outside the filter bed with liquid between the plate and the filter bed; and
the disc-like plate is configured to create additional pressure to the fluid by axial movements;
the receptacle having fixed lateral walls and bottom, but the filtration bed being free above, so that the filtration bed can go up and down, while the disc-like plate operates as a safety catch,
and wherein prior to starting the filtration phase, the rotatable mixing device is configured to;
move down to have the disc-like plate close to the filter bed and the knives inside the filter bed; and
rotate in order to reshape the filtration bed breaking up the filter bed when compacted
wherein the rotatable mixing device is adapted to only mix the granules in the upper region of the filter bed thereby eliminating preferential pathways in the filter bed material which would compromise an efficient filter action.

2. The filtering device according to claim 1, wherein the second filter unit within the receptacle comprises at least one automatic cleaning system comprising an inlet for a cleaning solution arranged at the receptacle upstream of the filter bed of the second filter unit.

3. The filtering device according to claim 1, comprising an ultrasonic system or a vibrating system as a cleaning device, assigned to the second filter unit and/or to the third filter unit.

4. The filtering device according to claim 1, wherein a receptacle containing the second filter unit is provided with a cooling or heating system in order to maintain the filter bed at a predetermined temperature or within a predetermined temperature range.

5. The filtering device according to claim 1, comprising a vacuum system including a vacuum pump and a vacuum conduct connected to the upper part of the receptacle containing the second filter unit, adapted to create a vacuum within the receptacle in a sector above the filter bed.

6. The filtering device according to claim 1, comprising a first receptacle which comprises at least one second filter unit with a filter bed and at least one third filter unit with a porous membrane, further comprising a second receptacle which comprises at least one second filter unit with a filter bed and at least one third filter unit with a porous membrane, wherein said first receptacle and said second receptacle are arranged in parallel or in series.

7. The filtering device according to claim 6, wherein the filter bed of the second filter unit in the first receptacle comprises different filter material than the filter bed of the second filter unit in the second receptacle.

8. The filtering device according to claim 6, further comprising a cleaning and/or regeneration system adapted to clean the filter bed of the second filter unit in the first receptacle in a cleaning modus while the filter bed of the second filter unit in the second receptacle is operating in a filter modus and vice versa to clean the filter bed of the second filter unit in the second receptacle in a cleaning and/or regeneration modus while the filter bed of the second filter unit in the first receptacle is operating in a filter modus.

9. The filtering device according to claim 1, wherein the filter bed of the second filter unit comprises nanoplatelets, sheets or flakes of graphene, modified graphene, graphene oxide or graphite in combination with a spacing material in granular form selected from selected from chemically or otherwise activated carbon, diatomaceous earth, zeolite, silver, silver chloride, bentonite, iron oxide and phosphorene, when the filtering device is in particular applied in an oenology sector, and more generally in a beverage sector, graphene and the other materials are combined or blended within themselves and with polymers including Polyvinylpolypyrrolidone (PVPP) or Polyvinylpyrrolidone (PVP).

10. Process for filtering a fluid, containing dissolved and optionally colloidal substances, and/or further impurities, by means of a filtering device wherein said fluid is a liquid which is filtered in a filtering device according to claim 1, and wherein the process comprises different phases, namely at least one filtering phase, wherein the liquid is passed through first filter unit, the second filter unit and consequently passed through the third filter unit and at least one regeneration phase, wherein particles detached from the filter bed of the second filter unit are recovered and recirculated to the second filter bed and/or at least one regeneration phase, wherein the membrane system of the third filter unit is regenerated by means of a cleaning liquid circulated through the third filter unit, and wherein the rotatable mixing device is used when the filter bed becomes compact and clogged, mixing it in order to reduce the weight, to remove the cohesion between the granules and to reduce the pressure drop so in the filter bed, so that the system can be washed, wherein the rotatable mixing device only mixes the granules in the upper region of the filter bed thereby eliminating preferential pathways in the filter bed material which would compromise an efficient filter action.

11. The process according to claim 10, wherein the filtering device comprises a first receptacle which comprises at least one second filter unit with a filter bed and at least one third filter unit with a porous membrane, and the filtering device further comprises a second receptacle which comprises at least one second filter unit with a filter bed and at least one third filter unit with a porous membrane, wherein said first receptacle and said second receptacle are arranged in parallel or in series and wherein the filter bed of the second filter unit in the first receptacle is cleaned in a cleaning modus while the filter bed of the second filter unit in the second receptacle is operating in a filter modus and vice versa the filter bed of the second filter unit in the second receptacle is cleaned in a cleaning modus while the filter bed of the second filter unit in the first receptacle is operating in a filter modus.

12. The process according to claim 10, wherein in the filtering phase a pressure is created to push the liquid through the second filter unit by means of at least one pressure creating device, selected from the group comprising a pump, arranged upstream of the second filter unit, the disc-like plate with holes and/or slots of the mixing device of the second filter unit and valves arranged downstream of the second filter unit, wherein the pressure within the second filter unit in the filtering phase is higher than in a regeneration phase or in a cleaning phase.

13. The process according to claim 10, wherein the liquid to be filtered and purified is one of the group comprising beverages, pharmaceutical products, chemical products, cosmetic products, wherein the filtering and purifying process serves to at least one of: recovery of flavorings, in particular terpenes, recovery of organic acids, in particular malic acid, filtration of sugars, purification of hemicellulosic hydrolysates, recovery of polyphenolic substances, purification of drugs as antipyretics, selection or purification of natural drug-like substances, recovery or purification of resveratrol, recovery of plant or algae extracts, filtration or purification of glycolic, salicylic or retinoic acid.

14. The process according to claim 10, wherein the dissolved or optionally colloidal substance to be removed is one of the group comprising caffeine, odor substances, coloring substances.

15. The process according to claim 10, wherein valuable substances, which are retained in at least one of the filter units are recovered from the respective retentate and/or from the filter material of the respective filter unit.

16. The filtering device according to claim 1, wherein the filter bed of the second filter unit comprises at least one filter material of the group comprising graphene, modified graphene, graphite, activated carbon, and a zeolite compound.

17. The process according to claim 12, where the pressure to push the liquid through the second filter unit and a corresponding pressure drop within the filter bed are adjusted in accordance with a particle size of the filter material of the filter bed, where the mixing device applies mixing to the compact filter material of the filter bed to remove cohesion between granules of the filter material of the filter bed reducing the pressure drop in the filter bed.

18. The filtering device of claim 1, wherein the rotatable mixing device is arranged above the filter bed and/or in the upper zone of the filter bed, within the filter bed.

* * * * *